United States Patent
Maheshwari et al.

(10) Patent No.: US 10,551,485 B1
(45) Date of Patent: Feb. 4, 2020

(54) FITTING POINTS TO A SURFACE

(71) Applicant: LUMINAR TECHNOLOGIES, INC., Orlando, FL (US)

(72) Inventors: Pranav Maheshwari, Palo Alto, CA (US); Tomi P. Maila, San Carlos, CA (US); Benjamin Englard, Palo Alto, CA (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

(21) Appl. No.: 16/196,650

(22) Filed: Nov. 20, 2018

Related U.S. Application Data

(60) Provisional application No. 62/715,030, filed on Aug. 6, 2018.

(51) Int. Cl.
| | | |
|---|---|---|
| *G01S 7/00* | (2006.01) | |
| *G01S 7/481* | (2006.01) | |
| *G06T 7/521* | (2017.01) | |
| *G01S 17/93* | (2006.01) | |
| *G01S 17/89* | (2006.01) | |

(Continued)

(52) U.S. Cl.
CPC .......... *G01S 7/4817* (2013.01); *G01S 7/4808* (2013.01); *G01S 7/497* (2013.01); *G01S 17/08* (2013.01); *G01S 17/89* (2013.01); *G01S 17/936* (2013.01); *G06T 7/521* (2017.01); *H04N 5/2329* (2013.01); *G06T 2207/30252* (2013.01)

(58) Field of Classification Search
USPC ....................................................... 356/5.01
See application file for complete search history.

(56) References Cited

U.S. PATENT DOCUMENTS

| | | | |
|---|---|---|---|
| 8,098,367 B2 * | 1/2012 | Kirk ..................... | G01C 15/002 356/141.4 |
| 9,043,069 B1 * | 5/2015 | Ferguson .............. | B60W 30/00 701/23 |

(Continued)

FOREIGN PATENT DOCUMENTS

| | | |
|---|---|---|
| WO | 2018/127789 | 7/2018 |
| WO | 2018/138584 | 8/2018 |

OTHER PUBLICATIONS

Non-Final Office Action dated Apr. 24, 2019 for U.S. Appl. No. 16/196,618.

(Continued)

*Primary Examiner* — James R Hulka

(57) ABSTRACT

A computer-implemented method of determining a relative velocity between a vehicle and an object. The method includes receiving sensor data generated by one or more sensors of the vehicle configured to sense an environment following a scan pattern. The method also includes obtaining, based on the sensor data, a point cloud frame. The point cloud frame comprises a plurality of points of depth data and a time at which the depth data was captured. Additionally, the method includes selecting two or more points of the scan pattern that overlap the object. The selected points are located on or near a two-dimensional surface corresponding to the object, and the depth data for two or more of the selected points are captured at different times. The method includes calculating the relative velocity between the vehicle and the object based on the depth data and capture times associated with the selected points.

24 Claims, 14 Drawing Sheets

(51) Int. Cl.
*G01S 7/48* (2006.01)
*G01S 7/497* (2006.01)
*H04N 5/232* (2006.01)
*G01S 17/08* (2006.01)

(56) References Cited

U.S. PATENT DOCUMENTS

| | | | |
|---|---|---|---|
| 9,424,371 B2 | 8/2016 | Shear et al. | |
| 2007/0171396 A1* | 7/2007 | Harris | G01S 7/493 |
| | | | 356/28 |
| 2010/0157283 A1* | 6/2010 | Kirk | G01C 15/002 |
| | | | 356/28 |
| 2012/0116728 A1* | 5/2012 | Shear | G06F 17/50 |
| | | | 703/1 |
| 2012/0173185 A1* | 7/2012 | Taylor | G01B 11/026 |
| | | | 702/104 |
| 2013/0054187 A1* | 2/2013 | Pochiraju | G01C 3/08 |
| | | | 702/150 |
| 2013/0242284 A1* | 9/2013 | Zeng | G01S 17/66 |
| | | | 356/4.01 |
| 2013/0242285 A1* | 9/2013 | Zeng | G01S 17/58 |
| | | | 356/28 |
| 2013/0246020 A1* | 9/2013 | Zeng | G06N 7/005 |
| | | | 703/2 |
| 2013/0300740 A1 | 11/2013 | Snyder et al. | |
| 2014/0064555 A1* | 3/2014 | Sebastian | G06T 5/003 |
| | | | 382/103 |
| 2014/0233010 A1* | 8/2014 | Baldwin | G01C 21/30 |
| | | | 356/4.01 |
| 2014/0313321 A1* | 10/2014 | Olsson | G01C 21/165 |
| | | | 348/135 |
| 2014/0368807 A1 | 12/2014 | Rogan | |
| 2015/0204652 A1* | 7/2015 | Olsson | G01S 17/89 |
| | | | 356/72 |
| 2015/0260844 A1* | 9/2015 | Sebastian | G06T 5/003 |
| | | | 382/103 |
| 2016/0196664 A1* | 7/2016 | Sebastian | G01C 11/02 |
| | | | 348/50 |
| 2017/0023677 A1* | 1/2017 | Olsson | G01S 17/89 |
| 2017/0046840 A1 | 2/2017 | Chen et al. | |
| 2017/0124781 A1 | 5/2017 | Douillard et al. | |
| 2017/0300059 A1* | 10/2017 | Rust | G01S 17/89 |
| 2017/0364758 A1* | 12/2017 | Minster | G06K 9/00825 |
| 2018/0024244 A1* | 1/2018 | Sebastian | G06T 5/003 |
| | | | 382/103 |
| 2018/0174327 A1 | 6/2018 | Singh | |
| 2018/0197139 A1 | 7/2018 | Hill | |
| 2018/0349522 A1 | 12/2018 | Aphek et al. | |
| 2019/0033459 A1 | 1/2019 | Tisdale et al. | |
| 2019/0061782 A1 | 2/2019 | Cheaz et al. | |
| 2019/0086549 A1* | 3/2019 | Ushani | G01S 17/936 |
| 2019/0086550 A1* | 3/2019 | Dussan | G01S 7/4814 |
| 2019/0222736 A1 | 7/2019 | Wheeler et al. | |

OTHER PUBLICATIONS

Non-Final Office Action dated Oct. 4, 2019 for U.S. Appl. No. 16/196,632.

International Search Report and Written Opinion dated Nov. 20, 2019 for PCT/US2019/045240.

* cited by examiner

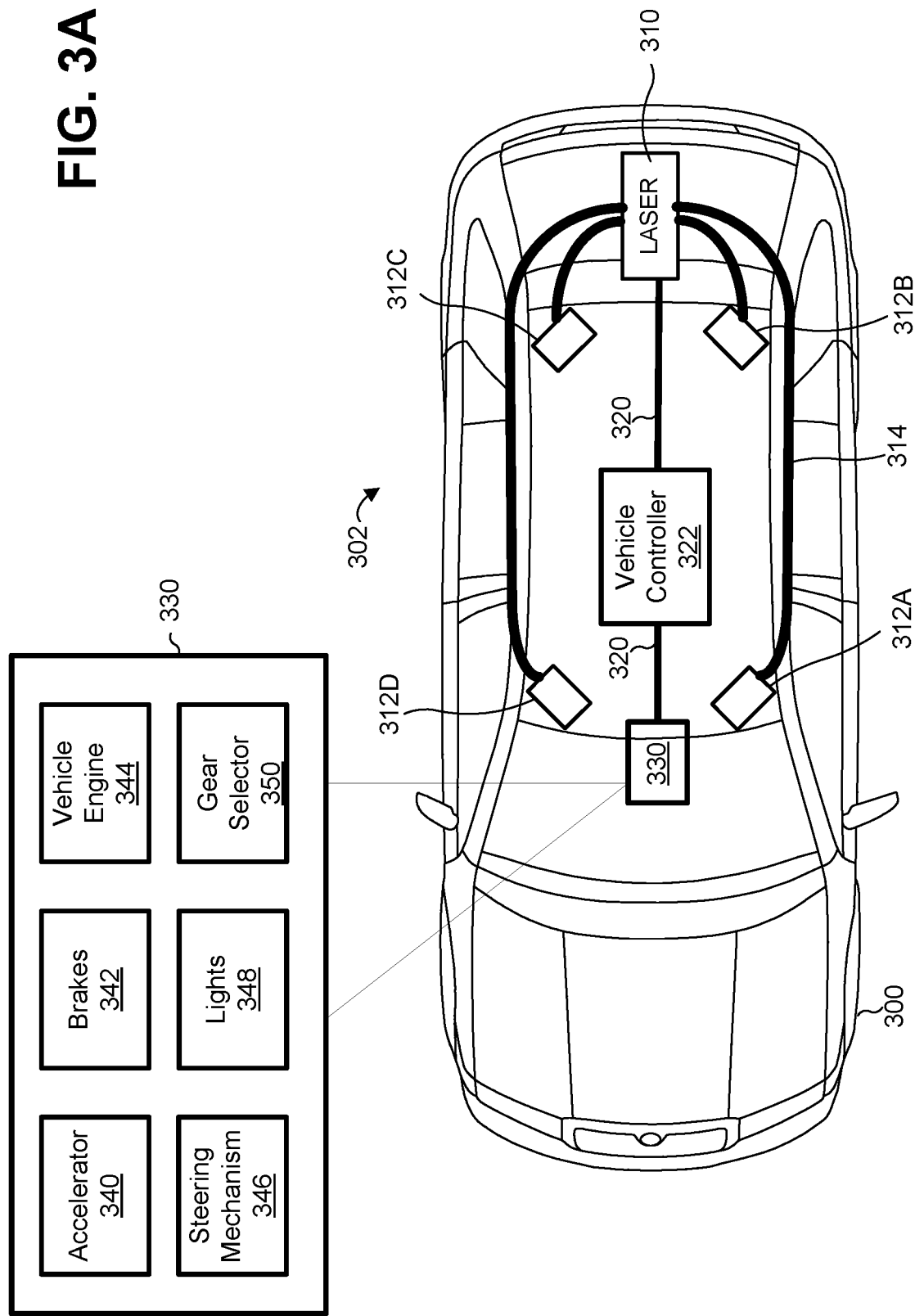

FITTING POINTS TO A SURFACE

CROSS-REFERENCE TO RELATED APPLICATION

This claims the benefit of U.S. Provisional Patent Application No. 62/715,030, filed on Aug. 6, 2018 and entitled "Utilizing and Correcting Object Distortion in Point Cloud Frames," the disclosure of which is hereby incorporated herein by reference in its entirety.

FIELD OF TECHNOLOGY

This disclosure generally relates to lidar systems, and, more particularly, to detecting, analyzing, correcting, and/or utilizing distortions in a point cloud produced by lidar systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Self-driving or "autonomous" vehicles generally employ sensors, such as light detection and ranging (lidar) devices, to detect or "see" the surrounding environment as the vehicles move toward their destinations. A single lidar laser cannot scan the entire field of regard at once. Instead, lidar lasers may be configured to follow a scan pattern to scan the field of regard. As the lidar laser follows the scan pattern, a scanner determines depth data by measuring the travel time for light beams that are transmitted by the lidar system and scattered or reflected by objects in the field of regard. Each of these points along the scan pattern are referred to as "pixels" and are correlated to the determined depth data. While the lidar system is capable of scanning the field of regard at high speeds, there is still a time a delay between when the scanner determines the depth data at the various pixels of the scan pattern. Thus, if an object in the field of regard is moving relative to the vehicle, the object may appear to be distorted.

SUMMARY

One example embodiment of the techniques of this disclosure is a computer-implemented method of determining a relative velocity between a vehicle and an object. The method includes receiving sensor data generated by one or more sensors of the vehicle. The one or more sensors are configured to sense an environment of the vehicle by following a scan pattern comprising component scan lines. The method also includes obtaining, based on the sensor data and by one or more processors, a point cloud frame representative of the environment. The point cloud frame comprises a plurality of points such that each point includes depth data associated with the point and a time at which the depth data was captured. Additionally, the method includes selecting, by the one or more processors, two or more points of the scan pattern that overlap the object. The selected points are located on or near a two-dimensional surface corresponding to at least part of the object, and the depth data for two or more of the selected points are captured at different times. Further, the method includes calculating, by the one or more processors, the relative velocity between the vehicle and the object based at least in part on the depth data and capture times associated with the selected points.

Another example embodiment of the techniques of this disclosure is a system within an autonomous vehicle. The system includes a set of sensors configured to generate a set of sensor data by sensing an environment of the vehicle by following a scan pattern comprising component scan lines. The system also includes a computing system configured to receive the set of sensor data. The computing system is also configured to obtain, based on the sensor data, a point cloud frame representative of the environment. The point cloud frame includes a plurality of points such that each point includes depth data associated with the point and a time at which the depth data was captured by the set of sensors. The computing system is also configured to select two or more points of the scan pattern that overlap an object in the environment. The selected points are located on or near a two-dimensional surface corresponding to at least part of the object, and the depth data for two or more of the selected points are captured at different times. Additionally the computing system is configured to calculate a relative velocity between the autonomous vehicle and the object based at least in part on the depth data and capture times associated with the selected points.

Another example embodiment of the techniques of this disclosure is a computer-implemented method of determining relative velocity between a vehicle and an object. The method includes receiving sensor data generated by one or more sensors of the vehicle. The one or more sensors are configured to sense an environment through which the vehicle is moving by following a scan pattern comprising component scan lines. The method includes obtaining, by one or more processors, a point cloud frame based on the sensor data and representative of the environment and identifying, by the one or more processors, a point cloud object within the point cloud frame. The method further includes determining, by the one or more processors, that the point cloud object is skewed relative to an expected configuration of the point cloud object, and determining, by the one or more processors, a relative velocity of the point cloud object by analyzing the skew of the object.

Another example embodiment of the techniques of this disclosure is a system within an autonomous vehicle. The system includes a set of sensors configured to generate a set of sensor data by sensing an environment of the vehicle by following a scan pattern comprising component scan lines. The system also includes a computing system configured to receive the set of sensor data and obtain a point cloud frame based on the sensor data and representative of the environment. The computing system is also configured to identify a point cloud object within the point cloud frame and determine that the point cloud object is skewed relative to an expected configuration of the point cloud object. Additionally, the computing system is configured to determine a relative velocity of the point cloud object by analyzing the skew of the object.

Another example embodiment of the techniques of this disclosure is a computer-implemented method of determining relative velocity between a vehicle and an object. The method includes receiving sensor data generated by one or more sensors of the vehicle. The one or more sensors are configured to sense an environment through which the vehicle is moving by following a scan pattern comprising component scan lines. The method also includes obtaining, based on the sensor data and by one or more processors, a point cloud frame representative of the environment. Additionally the method includes identifying, by the one or more processors, a first pixel and a second pixel that are co-located within a field of regard of the one or more sensors and overlap a point cloud object within the point cloud frame and calculating, by the one or more processors, a difference between a depth associated with the first pixel and a depth associated with the second pixel. The method also includes determining, by the one or more processors, a relative velocity of the point cloud object by dividing the difference in depth data by a time difference between when the depth associated with the first pixel was sensed and the depth associated with the second pixel was sensed.

Another example embodiment of the techniques of this disclosure is a system within an autonomous vehicle. The system includes a set of sensors configured to generate a set of sensor data by sensing an environment of the vehicle by following a scan pattern comprising component scan lines. The system also includes a computing system configured to receive the set of sensor data and obtain, based on the set of sensor data, a point cloud frame representative of the environment. The computing system is also configured to identify a first pixel and a second pixel that are co-located within a field of regard of the one or more sensors and overlap a point cloud object within the point cloud frame and calculate a difference between a depth associated with the first pixel and a depth associated with the second pixel. Additionally, the computing system is configured to determine a relative velocity of the point cloud object by dividing the difference in depth data by a time difference between when the depth associated with the first pixel was sensed and the depth associated with the second pixel was sensed.

Another example embodiment of the techniques of this disclosure is a computer-implemented method of determining relative velocity between a vehicle and an object. The method includes receiving sensor data generated by one or more sensors of the vehicle. The one or more sensors are configured to sense an environment through which the vehicle is moving by following a scan pattern comprising component scan lines. The method also includes obtaining, based on the sensor data and by one or more processors, two or more point cloud frames representative of the environment and tracking, by the one or more processors, a point cloud object across the two or more point cloud frames. Additionally, the method includes determining, based on the tracking and by the one or more processors, a relative velocity of the point cloud object and correcting, by the one or more processors, the point cloud object based on the relative velocity of the point cloud object.

Another example embodiment of the techniques of this disclosure is a system within an autonomous vehicle. The system includes a set of sensors configured to generate a set of sensor data by sensing an environment of the vehicle by following a scan pattern comprising component scan lines. The system also includes a computing system configured to receive the set of sensor data and obtain, based on the set of sensor data, two or more point cloud frames representative of the environment. The computing system is also configured to track a point cloud object across the two or more point cloud frames. Additionally, the computing system is configured to determine, based on the tracking, a relative velocity of the point cloud object and correct the point cloud object based on the relative velocity of the point cloud object.

Another example embodiment of the techniques of this disclosure is a computer-implemented method of detecting object distortion. The method includes receiving sensor data generated by one or more sensors of the vehicle. The one or more sensors are configured to sense an environment through which the vehicle is moving by following a scan pattern. The method also includes obtaining, based on the sensor data and by one or more processors, a point cloud frame representative of the environment and identifying, by one or more processors, a point cloud object within the point cloud frame. Additionally, the method includes analyzing, by the one or more processors, the point cloud object to identify a feature of the point cloud object that has an expected shape and comparing, by the one or more processors, the feature of the point cloud object to the expected shape. The method also includes identifying, by the one or more processors, that the point cloud object is distorted based on the feature of the point cloud object not matching the expected shape.

Another example embodiment of the techniques of this disclosure is a system within an autonomous vehicle. The system includes a set of sensors configured to generate a set of sensor data by sensing an environment of the vehicle by following a scan pattern comprising component scan lines. The system also includes a computing system configured to receive the set of sensor data and obtain, based on the sensor data, a point cloud frame representative of the environment. The computing system is also configured to identify a point cloud object within the point cloud frame and analyze the point cloud object to identify a feature of the point cloud object that has an expected shape. Additionally, the computing system is configured to compare the feature of the point cloud object to the expected shape and identify that the point cloud object is distorted based on the feature of the point cloud object not matching the expected shape.

Another example embodiment of the techniques of this disclosure is a computer-implemented method of detecting object distortion. The method includes receiving sensor data generated by a plurality of sensors of the vehicle. The plurality of sensors includes a first set of one or more sensors, wherein each sensor of the first set of sensors is configured to sense an environment through which the vehicle is moving by, for each frame produced by the sensor, sequentially advancing through a plurality of points in a scan pattern. The plurality of sensors also include a second set of one or more sensors, wherein each sensor of the second set of sensors is configured to sense the environment by, for each frame produced by the sensor, capturing an entirety of the frame at a single time. The method also includes identifying, by one or more processors, an object within the environment. Additionally, the method includes analyzing, by the one or more processors, the data sensed by the first set of sensors to identify a point cloud representation of the object and analyzing, by the one or more processors, the data sensed by the second set of sensors to identify the object within the data sensed by the second set of sensors. The method also includes comparing, by the one or more processors, a shape of the point cloud representation of the object to a shape of the object as sensed by the second set of sensors and identifying, by the one or more processors, that the object is distorted based on the shape of the point cloud representation of the object component not matching the shape of the object as sensed by the second set of sensors.

Another example embodiment of the techniques of this disclosure is a system within an autonomous vehicle. The system includes a first set of one or more sensors configured to sense an environment through which the vehicle is moving by, for each frame produced by the sensor, sequentially advancing through a plurality of points in a scan pattern. The system also includes a second set of one or more sensors configured to sense the environment by, for each frame produced by the sensor, capturing an entirety of the frame at a single time. Additionally, the system includes a computing system configured to receive data generated by the first and second sets of one or more sensors and identify an object within the environment. The computing system is also configured to analyze the data sensed by the first set of sensors to identify a point cloud representation of the object and analyze the data sensed by the second set of sensors to identify the object within the data sensed by the second set of sensors. Additionally, the computing system is configured to compare a shape of the point cloud representation of the object to a shape of the object as sensed by the second set of sensors and identify that the object is distorted based on the shape of the point cloud representation of the object component not matching the shape of the object as sensed by the second set of sensors.

BRIEF DESCRIPTION OF THE DRAWINGS

FIG. 3A illustrates an example vehicle in which the lidar system of FIG. 2 may operate;

DETAILED DESCRIPTION

Overview

Figure 1A:
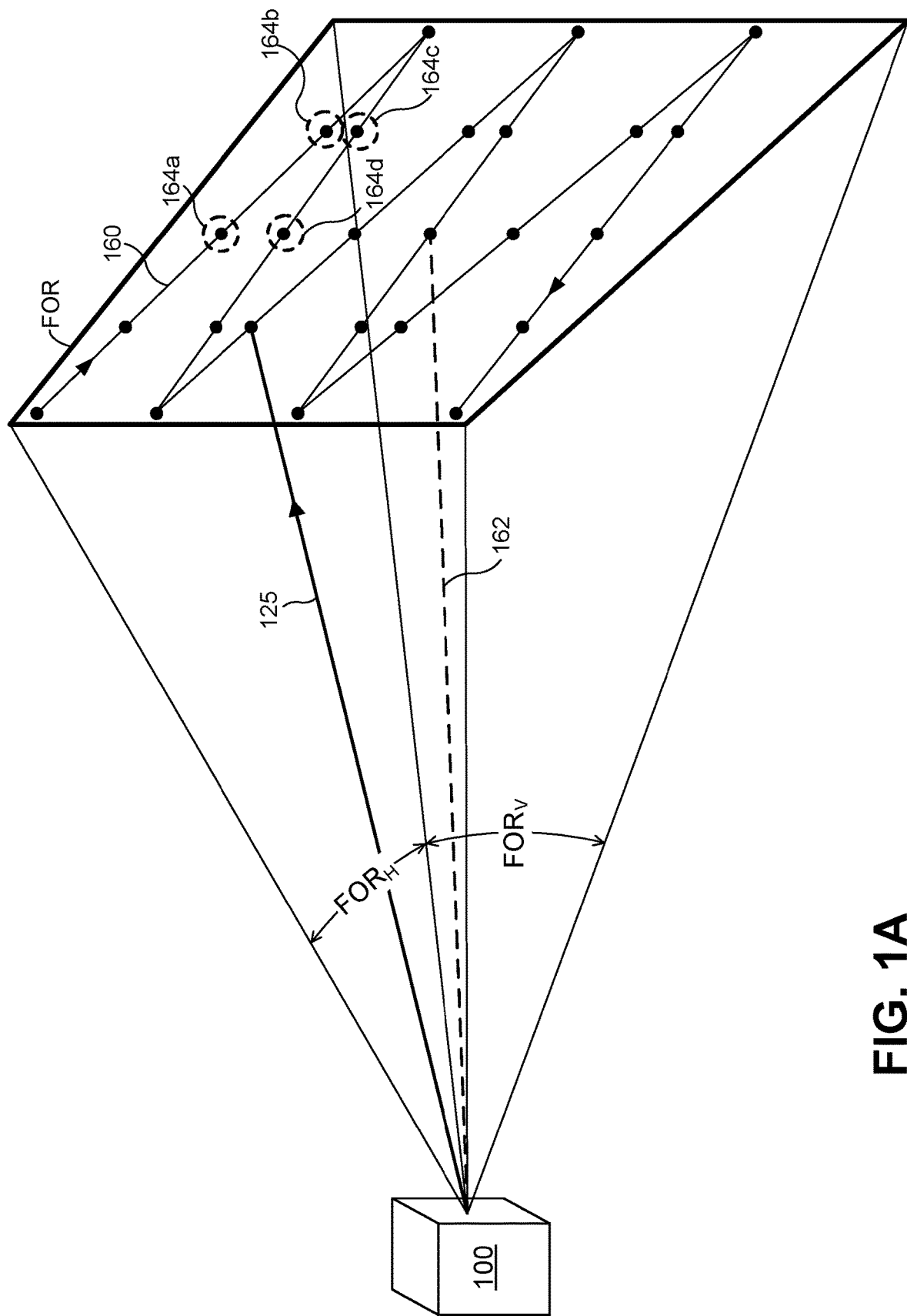
FIG. 1A illustrates an example, conventional "zigzag" scan pattern which a light detection and ranging (lidar) system can produce when identifying targets within a field of regard.

Generally speaking, when a lidar system produces a frame of depth data (e.g., a point cloud frame), the frame includes depth data captured at different times within the frame period. For instance, when the lidar system captures depth data indicative of a surface on which all points are equidistant from the lidar system, and if the surface is moving with respect to the lidar system, the surface will be at different positions for different pixels within the same point cloud frame. This may cause the surface to appear skewed within the point cloud representation. For example, if the surface is moving closer to or more distant from the lidar system, the surface may appear to be "tilted" or "skewed" toward or away from the lidar system. As another example, if the scan lines in the scan pattern are generally horizontal (parallel to the ground), a surface moving laterally relative to the lidar system may appear to be tilted or skewed in a lateral direction, and a surface moving up or down relative to the lidar system may appear to be longer or shorter. On the other hand, if the scan lines of the scan pattern are generally vertical (perpendicular to the ground), surfaces moving laterally relative to the lidar system may appear to be wider or narrower, and surfaces moving up or down relative to the lidar system may appear to be tilted or skewed. The term "rolling shutter distortion" is generally used herein to refer to this phenomenon.

In some aspects, simply analyzing the overall shape of an object or surface may be inadequate to determine if an object or surface is experiencing rolling shutter distortion; in some scenarios the object or surface is actually shaped in a manner that may appear distorted. Accordingly, the lidar system is configured to implement various techniques to distinguish between objects that are experiencing rolling shutter distortion (e.g., a telephone pole that only appears to be tilted due to relative velocity) and objects that are actually shaped in a manner similar to a distorted object (e.g., a telephone pole that is actually tilted).

In one disclosed technique corresponding to one embodiment, the lidar system fits two or more points onto a two-dimensional surface to model the motion (including velocity) of the point cloud object. The lidar system may then use the depth data associated with the two or more points to model the motion of the surface to approximate the relative velocity of the point cloud object. In some aspects, the lidar system fits an additional two or more points associated with a different scan line to the two-dimensional surface. In these aspects, the lidar systems determines and compares a relative velocity of the surface using each set of two or more points. By comparing the polarity of the relative velocities of the object based on depth data on subsequent scan lines, the lidar system can determine that the object is experiencing rolling shutter distortion and, if the object is distorted, the direction of the distortion (i.e., which direction the object is moving relative to the vehicle). Moreover, by determining a rate of change between the relative velocities, the lidar system can also determine the relative acceleration of the object.

In another disclosed technique that is implemented in one embodiment, the lidar system analyzes co-located pixels (i.e., pixels at the same location in the field of regard but captured at different points of time within a point cloud frame) to detect rolling shutter distortion. In some implementations, the depth data for the co-located pixels are captured by two different lidar scanners. In other implementations, the depth data for the co-located pixels are captured by the same lidar scanner (i.e., the scan pattern crosses over the same location in the field of regard at multiple points in time during the point cloud frame). By comparing the depth data for the co-located pixels, the lidar system can determine whether the object is moving relative to the vehicle, and thus experiencing rolling shutter distortion.

In another disclosed technique corresponding to one embodiment, the lidar system compares the shape of a point cloud to reference image data captured by a RGB or stereo camera to detect rolling shutter distortion. The RGB or stereo camera doesn't include delays introduced by a scan pattern, and therefore indicates the "true" shape of an object. Accordingly, the lidar system can compare the point cloud object to corresponding RGB data to determine whether the shapes of the two objects match. When the shapes match, the point cloud object is not experiencing rolling shutter distortion (i.e., the object is actually shaped as detected by the lidar system).

The rolling shutter distortion introduced by a lidar system scan pattern generally impacts objects that are closer to the vehicle more than objects that are further away. In particular, closer objects will typically be associated with more pixels than further away objects, and thus it takes more time to capture the depth data for all pixels corresponding to the nearby object. This allows the object and/or the vehicle to move further within the relevant portion of the scan pattern, which in turn causes the resulting depth data to distort the object more heavily, causing it to appear as if it is curved or skewed.

Accordingly, in still another disclosed technique corresponding to one embodiment, the lidar system includes a database of objects (or features thereof) that have known, fixed shapes. For instance, license plates are rectangular, wheels are round, manufacturer logos have known, fixed shapes, etc. Thus, if the point cloud object in question includes a feature associated with one of these known, fixed shapes, the lidar system can determine whether the feature is curved (and therefore not matching the known, expected shape) to determine that the object is distorted.

Additionally, disclosed techniques leverage the fact that the amount and nature of distortion detected is indicative of the relative velocity and direction between the object and the vehicle. In some disclosed embodiments, the lidar system detects and analyzes the amount of the distortion to determine vehicle and/or object velocity. Thus, utilizing the disclosed techniques, the lidar system can determine the vehicle and/or object velocity based on a single point cloud frame. This enables the lidar system to determine vehicle and/or object velocity faster than traditional techniques that track objects between multiple point cloud frames.

That said, the lidar system may still track objects across multiple point cloud frames. For example, in one embodiment, the lidar system determines relative velocity of an object using multiple point cloud frame tracking techniques. In some scenarios, a correlation between relative velocity and the magnitude of distortion is determined to develop a distortion factor indicative of the distortion introduced in each subsequent scan line and/or pixel. The lidar system then applies this distortion factor to other point cloud objects to determine the relative velocity of the other point cloud objects.

In some embodiments, after detecting that a point cloud object is distorted, the lidar system corrects the shape of the point cloud object before the point cloud frame and/or object data is analyzed by a classification module, a tracking module, or a prediction component of the lidar system. For example, the distortion factor can be applied to remove the distortion introduced by the time difference between successive scan lines or pixels. Accordingly, the lidar system may apply an inverse operation to shift the point cloud data to remove rolling shutter distortion.

An example lidar system in which the above techniques can be implemented is considered first with reference to FIGS. 1-4. An example implementation of a vehicle controller that interacts with the example lidar systems is then discussed with reference to FIGS. 5-6. Finally, example methods corresponding to distortion detection, analysis, and correction are discussed with reference to the flow diagrams of FIGS. 7-12.

Example Lidar Systems

Figure 2:
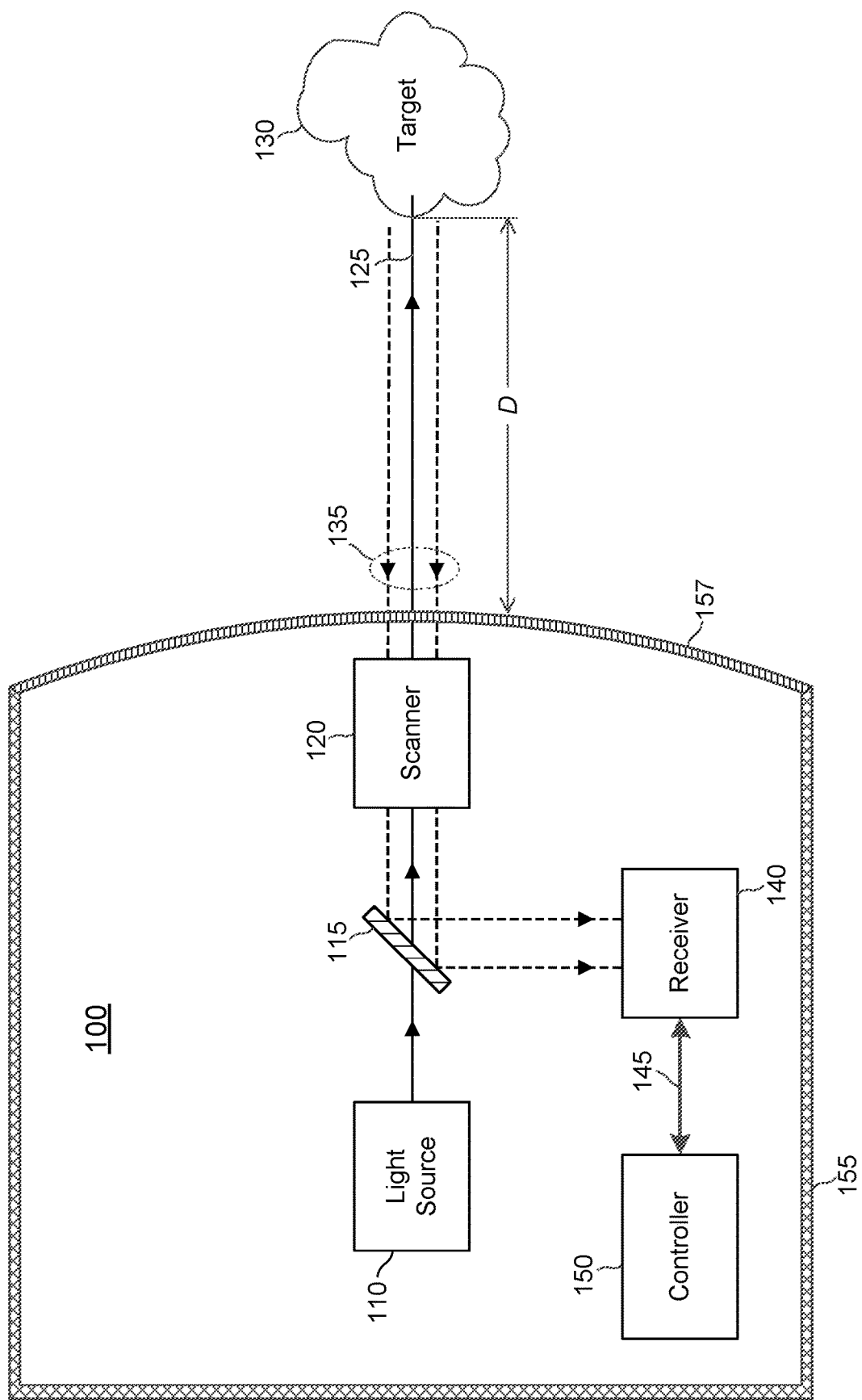
FIG. 2 is a block diagram of an example lidar system which can implement the scan patterns of FIGS. 1A and/or 1B, as well as other techniques of this disclosure.

FIG. 2 illustrates an example light detection and ranging (lidar) system 100. While various lidar system components and characteristics are described herein, it is understood that any suitable lidar device(s) or system(s), and/or any other suitable types of sensors, may provide sensor data for processing using the software architectures described herein.

The example lidar system 100 may include a light source 110, a mirror 115, a scanner 120, a receiver 140, and a controller 150. The light source 110 may be, for example, a laser (e.g., a laser diode) that emits light having a particular operating wavelength in the infrared, visible, or ultraviolet portions of the electromagnetic spectrum. In operation, the light source 110 emits an output beam of light 125 which may be continuous-wave, pulsed, or modulated in any suitable manner for a given application. The output beam of light 125 is directed downrange toward a remote target 130 located a distance D from the lidar system 100 and at least partially contained within a field of regard of the system 100.

Once the output beam 125 reaches the downrange target 130, the target 130 may scatter or, in some cases, reflect at least a portion of light from the output beam 125, and some of the scattered or reflected light may return toward the lidar system 100. In the example of FIG. 2, the scattered or reflected light is represented by input beam 135, which passes through the scanner 120, which may be referred to as a beam scanner, optical scanner, or laser scanner. The input beam 135 passes through the scanner 120 to the mirror 115, which may be referred to as an overlap mirror, superposition mirror, or beam-combiner mirror. The mirror 115 in turn directs the input beam 135 to the receiver 140.

The input beam 135 may include light from the output beam 125 that is scattered by the target 130, light from the output beam 125 that is reflected by the target 130, or a combination of scattered and reflected light from target 130. According to some implementations, the lidar system 100 can include an "eye-safe" laser that present little or no possibility of causing damage to a person's eyes. The input beam 135 may contain only a relatively small fraction of the light from the output beam 125.

The receiver 140 may receive or detect photons from the input beam 135 and generate one or more representative signals. For example, the receiver 140 may generate an output electrical signal 145 that is representative of the input beam 135. The receiver 140 may send the electrical signal 145 to the controller 150. Depending on the implementation, the controller 150 may include one or more instruction-executing processors, an application-specific integrated circuit (ASIC), a field-programmable gate array (FPGA), and/or other suitable circuitry configured to analyze one or more characteristics of the electrical signal 145 in order to determine one or more characteristics of the target 130, such as its distance downrange from the lidar system 100. More particularly, the controller 150 may analyze the time of flight or phase modulation for the beam of light 125 transmitted by the light source 110. If the lidar system 100 measures a time of flight of T (e.g., T representing a round-trip time of flight for an emitted pulse of light to travel from the lidar system 100 to the target 130 and back to the lidar system 100), then the distance D from the target 130 to the lidar system 100 may be expressed as D=c·T/2, where c is the speed of light (approximately 3.0×10⁸ m/s).

The distance D from the lidar system 100 is less than or equal to a maximum range $R_{MAX}$ of the lidar system 100. The maximum range $R_{MAX}$ (which also may be referred to as a maximum distance) of a lidar system 100 may correspond to the maximum distance over which the lidar system 100 is configured to sense or identify targets that appear in a field of regard of the lidar system 100. The maximum range of lidar system 100 may be any suitable distance, such as 50 m, 200 m, 500 m, or 1 km, for example.

In some implementations, the light source 110, the scanner 120, and the receiver 140 may be packaged together within a single housing 155, which may be a box, case, or enclosure that holds or contains all or part of the lidar system 100. The housing 155 includes a window 157 through which the beams 125 and 135 pass. The controller 150 may reside within the same housing 155 as the components 110, 120, and 140, or the controller 150 may reside outside of the housing 155. In one embodiment, for example, the controller 150 may instead reside within, or partially within, a perception component of a control architecture (described below). In some implementations, the housing 155 includes multiple lidar sensors, each including a respective scanner and a receiver. Depending on the particular implementation, each of the multiple sensors can include a separate light source or a common light source. The multiple sensors can be configured to cover non-overlapping adjacent fields of regard or partially overlapping fields of regard, for example, depending on the implementation. In embodiments that include partially overlapping fields of regard, the multiple sensors may direct an output beam 125 at the same location on the target 130 at different points of time to obtain co-located depth data.

With continued reference to FIG. 2, the output beam 125 and input beam 135 may be substantially coaxial. In other words, the output beam 125 and input beam 135 may at least partially overlap or share a common propagation axis, so that the input beam 135 and the output beam 125 travel along substantially the same optical path (albeit in opposite directions). As the lidar system 100 scans the output beam 125 across a field of regard, the input beam 135 may follow along with the output beam 125, so that the coaxial relationship between the two beams is maintained.

Generally speaking, the scanner 120 steers the output beam 125 in one or more directions downrange. To accomplish this, the scanner 120 may include one or more scanning mirrors and one or more actuators driving the mirrors to rotate, tilt, pivot, or move the mirrors in an angular manner about one or more axes, for example. While FIG. 2 depicts only a single mirror 115, the lidar system 100 may include any suitable number of flat or curved mirrors (e.g., concave, convex, or parabolic mirrors) to steer or focus the output beam 125 or the input beam 135. For example, the first mirror of the scanner may scan the output beam 125 along a first direction, and the second mirror may scan the output beam 125 along a second direction that is substantially orthogonal to the first direction.

A "field of regard" of the lidar system 100 may refer to an area, region, or angular range over which the lidar system 100 may be configured to scan or capture distance information. When the lidar system 100 scans the output beam 125 within a 30-degree scanning range, for example, the lidar system 100 may be referred to as having a 30-degree angular field of regard. The scanner 120 may be configured to scan the output beam 125 horizontally and vertically, and the field of regard of the lidar system 100 may have a particular angular width along the horizontal direction and another particular angular width along the vertical direction. For example, the lidar system 100 may have a horizontal field of regard of 10° to 120° and a vertical field of regard of 2° to 45°.

The one or more scanning mirrors of the scanner 120 may be communicatively coupled to the controller 150, which may control the scanning mirror(s) so as to guide the output beam 125 in a desired direction downrange or along a desired scan pattern. In general, a scan (or scan line) pattern may refer to a pattern or path along which the output beam 125 is directed. The lidar system 100 can use the scan pattern to generate a point cloud with points or "pixels" that substantially cover the field of regard. The pixels may be approximately evenly distributed across the field of regard, or distributed according to a particular non-uniform distribution. In some embodiments, for example as shown in FIG. 1B, two or more of the pixels may be co-located within the field of regard.

In operation, the light source 110 may emit pulses of light which the scanner 120 scans across a field of regard of the lidar system 100. The target 130 may scatter one or more of the emitted pulses, and the receiver 140 may detect at least a portion of the pulses of light scattered by the target 130. The receiver 140 may receive or detect at least a portion of the input beam 135 and produce an electrical signal that corresponds to the input beam 135. The controller 150 may be electrically coupled or otherwise communicatively coupled to one or more of the light source 110, the scanner 120, and the receiver 140. The controller 150 may provide instructions, a control signal, or a trigger signal to the light source 110 indicating when the light source 110 should produce optical pulses, and possibly characteristics (e.g., duration, period, peak power, wavelength, etc.) of the pulses. The controller 150 may also determine a time-of-flight value for an optical pulse based on timing information associated with when the pulse was emitted by light source 110 and when a portion of the pulse (e.g., the input beam 135) was detected or received by the receiver 140.

As indicated above, the lidar system 100 may be used to determine the distance to one or more downrange targets 130. By scanning the lidar system 100 across a field of regard, the system can be used to map the distance to a number of points (e.g., pixels) within the field of regard. A collection of pixels captured in succession (which may be referred to as a depth map, a point cloud, or a point cloud frame) may be rendered as an image or may be analyzed to identify or detect objects or to determine a shape or distance of objects within the field of regard. For example, a depth map may cover a field of regard that extends 60° horizontally and 15° vertically, and the depth map may include a frame of 100-2000 pixels in the horizontal direction by 4-400 pixels in the vertical direction.

The lidar system 100 may be configured to repeatedly capture or generate point cloud frames of a field of regard at any suitable frame rate between approximately 0.1 frames per second (FPS) and approximately 1,000 FPS, for example. The point cloud frame rate may be substantially fixed or dynamically adjustable, depending on the implementation. In general, the lidar system 100 can use a slower frame rate (e.g., 1 Hz) to capture one or more high-resolution point clouds, and use a faster frame rate (e.g., 10 Hz) to rapidly capture multiple lower-resolution point clouds.

The field of regard of the lidar system 100 can overlap, encompass, or enclose at least a portion of the target 130, which may include all or part of an object that is moving or stationary relative to lidar system 100. For example, the target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Figure 1B:
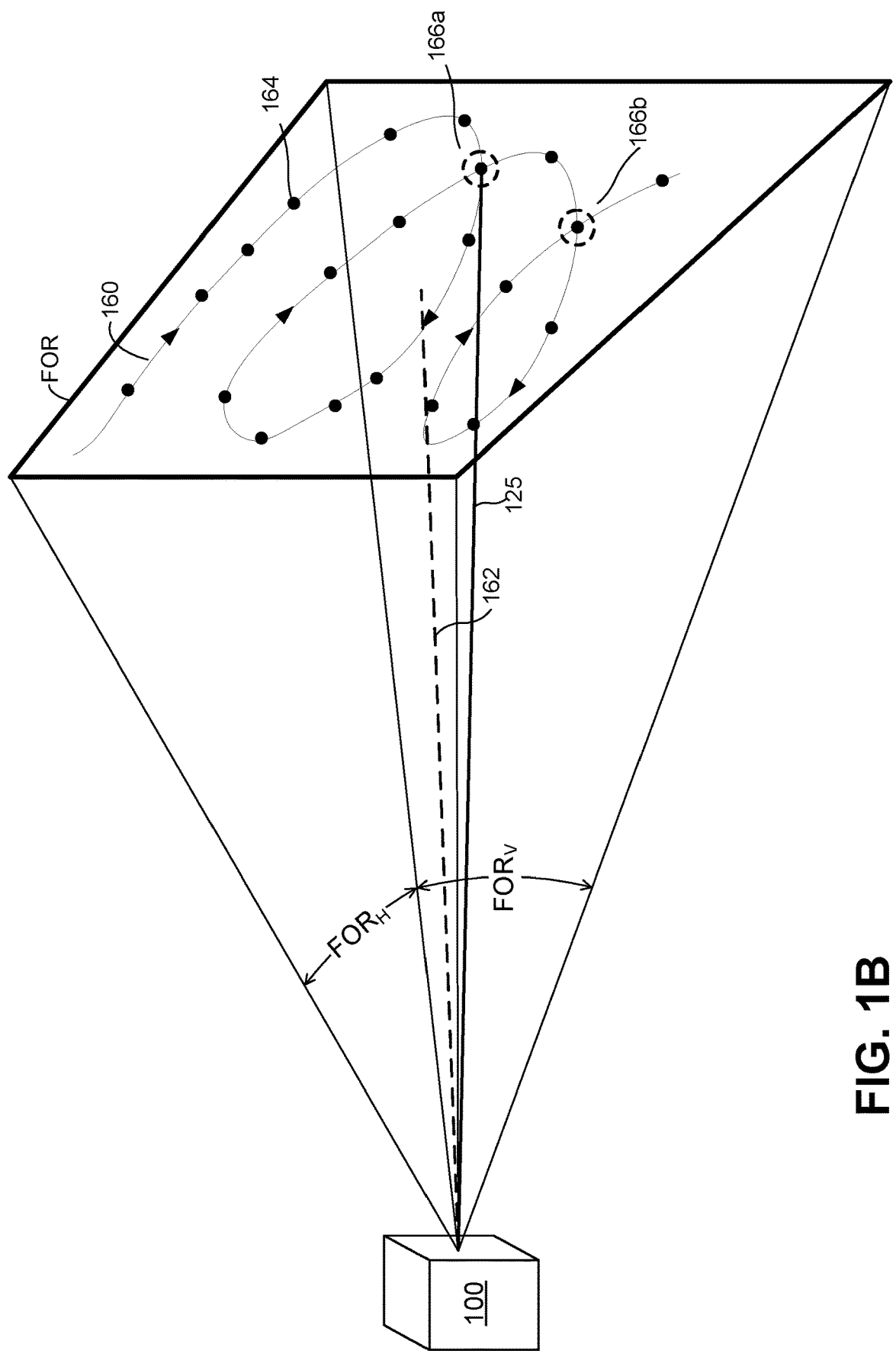
FIG. 1B illustrates an example "looping" scan pattern which a lidar system can produce when identifying targets within a field of regard.

FIGS. 1A and 1B illustrate example scan patterns 160, either or both of which the lidar system 100 of FIG. 2 may produce. In particular, the lidar system 100 may be configured to scan the output optical beam 125 along the scan pattern 160. In some implementations, the scan pattern 160 corresponds to a scan across any suitable field of regard having any suitable horizontal field of regard ($FOR_H$) and any suitable vertical field of regard ($FOR_V$). For example, a certain scan pattern may have a field of regard represented by angular dimensions (e.g., $FOR_H \times FOR_V$) 40°×30°, 90°×40°, or 60°×15°. While FIG. 1A depicts a conventional "zig-zag" pattern 160, other implementations may instead employ other patterns (e.g., parallel, horizontal scan lines), and/or other patterns may be employed in specific circumstances. For example, the "looping" pattern 160 depicted in FIG. 1B includes co-located pixels 166 (that is, a pair of co-located pixels at 166a, and a different pair co-located pixels at 166b) to capture depth data at the same horizontal and vertical angles in the field of regard at multiple points of time within the same point cloud frame. Although "co-located" is generally used to refer to pixels at the same location within the field of regard, in some implementations, co-located refers to pixels within a small, threshold distance of one another. In some implementations this threshold distance is defined as a difference in the vertical and/or horizontal angles.

In the example implementations and/or scenarios of FIGS. 1A-1B, reference line 162 represents a center of the field of regard of scan pattern 160. Accordingly, if the scan pattern 160 has a 60°×15° field of regard, then the scan pattern 160 covers a ±30° horizontal range with respect to reference line 162 and a ±7.5° vertical range with respect to reference line 162. An azimuth (which may be referred to as an azimuth angle) may represent a horizontal angle with respect to the reference line 162, and an altitude (which may be referred to as an altitude angle, elevation, or elevation angle) may represent a vertical angle with respect to the reference line 162.

The scan pattern 160 may include multiple points or pixels 164, and each pixel 164 may be associated with one or more laser pulses and one or more corresponding distance measurements. A cycle of scan pattern 160 may include a total of $P_x \times P_y$ pixels 164 (e.g., a two-dimensional distribution of $P_x$ by $P_y$ pixels). The number of pixels 164 along a horizontal direction may be referred to as a horizontal resolution of the scan pattern 160, and the number of pixels 164 along a vertical direction may be referred to as a vertical resolution of the scan pattern 160.

Each pixel 164 may be associated with a distance (e.g., a distance to a portion of a target 130 from which the corresponding laser pulse was scattered), one or more angular values. As an example, the pixel 164 may be associated with a distance value and two angular values (e.g., an azimuth and altitude) that represent the angular location of the pixel 164 with respect to the lidar system 100. A distance to a portion of the target 130 may be determined based at least in part on a time-of-flight measurement for a corresponding pulse. An angular value (e.g., an azimuth or altitude) may correspond to an angle (e.g., relative to reference line 162) of the output beam 125 (e.g., when a corresponding pulse is emitted from lidar system 100) or an angle of the input beam 135 (e.g., when an input signal is received by lidar system 100). In some implementations, the lidar system 100 determines an angular value based at least in part on a position of a component of the scanner 120. For example, an azimuth or altitude value associated with the pixel 164 may be determined from an angular position of one or more corresponding scanning mirrors of the scanner 120. In some implementations, each pixel 164 is also associated with a time value, such as a time stamp indicative of when an output beam (e.g., the output beam 125) is emitted or when an input beam (e.g., the input beam 135) is detected.

FIG. 3A illustrates an example vehicle 300 with a lidar system 302. The lidar system 302 includes a laser 310 with multiple sensor heads 312A-D coupled to the laser 310 via multiple laser-sensor links 314. Each of the sensor heads 312 may include some or all of the components of the lidar system 100 illustrated in FIG. 2.

Each of the laser-sensor links 314 may include one or more optical links and/or one or more electrical links. The sensor heads 312 in FIG. 3A are positioned or oriented to provide a greater than 30-degree view of an environment around the vehicle. More generally, a lidar system with multiple sensor heads may provide a horizontal field of regard around a vehicle of approximately 30°, 45°, 60°, 90°, 120°, 180°, 270°, or 360°. Each of the sensor heads 312 may be attached to, or incorporated into, a bumper, fender, grill, side panel, spoiler, roof, headlight assembly, taillight assembly, rear-view mirror assembly, hood, trunk, window, or any other suitable part of the vehicle.

In the example of FIG. 3A, four sensor heads 312 are positioned at or near the four corners of the vehicle (e.g., each of the sensor heads 312 may be incorporated into a light assembly, side panel, bumper, or fender), and the laser 310 may be located within the vehicle 300 (e.g., in or near the trunk). The four sensor heads 312 may each provide a 90° to 120° horizontal field of regard (FOR), and the four sensor heads 312 may be oriented so that together they provide a complete 360-degree view around the vehicle. As another example, the lidar system 302 may include six sensor heads 312 positioned on or around the vehicle 300, where each of the sensor heads 312 provides a 60° to 90° horizontal FOR. As another example, the lidar system 302 may include eight sensor heads 312, and each of the sensor heads 312 may provide a 45° to 60° horizontal FOR. As yet another example, the lidar system 302 may include six sensor heads 312, where each of the sensor heads 312 provides a 70° horizontal FOR with an overlap between adjacent FORs of approximately 10°. As another example, the lidar system 302 may include two sensor heads 312 which together provide a forward-facing horizontal FOR of greater than or equal to 30°.

Data from each of the sensor heads 312 may be combined or stitched together to generate a point cloud that covers a greater than or equal to 30-degree horizontal view around a vehicle. For example, the laser 310 may include a controller or processor that receives data from each of the sensor heads 312 (e.g., via a corresponding electrical link 320) and processes the received data to construct a point cloud covering a 360-degree horizontal view around a vehicle or to determine distances to one or more targets. The point cloud or information from the point cloud may be provided to a vehicle controller 322 via a corresponding electrical, optical, or radio link 320. The vehicle controller 322 may include one or more CPUs, GPUs, and a non-transitory memory with persistent components (e.g., flash memory, an optical disk) and/or non-persistent components (e.g., RAM).

In some implementations, the point cloud is generated by combining data from each of the multiple sensor heads 312 at a controller included within the laser 310, and is provided to the vehicle controller 322. In other implementations, each of the sensor heads 312 includes a controller or processor that constructs a point cloud for a portion of the 360-degree horizontal view around the vehicle and provides the respective point cloud to the vehicle controller 322. The vehicle controller 322 then combines or stitches together the points clouds from the respective sensor heads 312 to construct a combined point cloud covering a 360-degree horizontal view. Still further, the vehicle controller 322 in some implementations communicates with a remote server to process point cloud data.

In some embodiments, respective controllers included within the multiple sensor heads 312 process their respectively constructed point clouds to detect, analyze, and/or correct for distortion, including rolling shutter distortion, prior to providing the constructed point cloud to the laser 310 or the vehicle controller 312. In other embodiments, a controller included within the laser 310 processes the point cloud to correct for detect, analyze, and/or correct distortion, including rolling shutter distortion, prior to providing the point cloud to the vehicle controller 322. For example, in implementations where the multiple sensor heads 312 construct respective point clouds, the laser 310 may analyze the constructed point clouds to detect and correct for distortion prior to combining or stitching the point clouds together. As another example, in implementations where the multiple sensors heads 312 do not construct the point cloud, the laser 310 detects, analyzes, and/or corrects for the distortion while combining the raw data from the multiple sensor heads. In still other embodiments, the vehicle controller 322 analyzes point clouds data provided by the laser 310 or the multiple sensor heads 312 to detect, analyze, and/or correct for distortion, including rolling shutter distortion, prior to processing the point cloud via the various components of the vehicle controller 322 described herein.

In any event, the vehicle 300 may be an autonomous vehicle where the vehicle controller 322 provides control signals to various components 330 within the vehicle 300 to maneuver and otherwise control operation of the vehicle 300. The components 330 are depicted in an expanded view in FIG. 3A for ease of illustration only. The components 330 may include an accelerator 340, brakes 342, a vehicle engine 344, a steering mechanism 346, lights 348 such as brake lights, head lights, reverse lights, emergency lights, etc., a gear selector 350, and/or other suitable components that effectuate and control movement of the vehicle 300. The gear selector 350 may include the park, reverse, neutral, drive gears, etc. Each of the components 330 may include an interface via which the component receives commands from the vehicle controller 322 such as "increase speed," "decrease speed," "turn left 5 degrees," "activate left turn signal," etc. and, in some cases, provides feedback to the vehicle controller 322.

In some implementations, the vehicle controller 322 receives point cloud data from the sensor heads 312 or laser 310 via the link 320 and analyzes the received point cloud data to sense or identify targets 130 (see FIG. 1) and their respective locations, distances, speeds, shapes, sizes, type of target (e.g., vehicle, human, tree, animal), etc. The vehicle controller 322 then provides control signals via the link 320 to the components 330 to control operation of the vehicle based on the analyzed information. One, some or all of the components 330 may be the operational subsystems, or may be included within the operational subsystems, that receive the control signals.

In addition to the lidar system 302, the vehicle 300 may also be equipped with other sensors such as a RGB or stereo camera, a thermal imager, a conventional radar (none illustrated to avoid clutter), etc. The sensors can provide additional data to the vehicle controller 322 via wired or wireless communication links. Further, the vehicle 300 in an example implementation includes a microphone array operating as a part of an acoustic source localization system configured to determine sources of sounds.

Figure 3B:
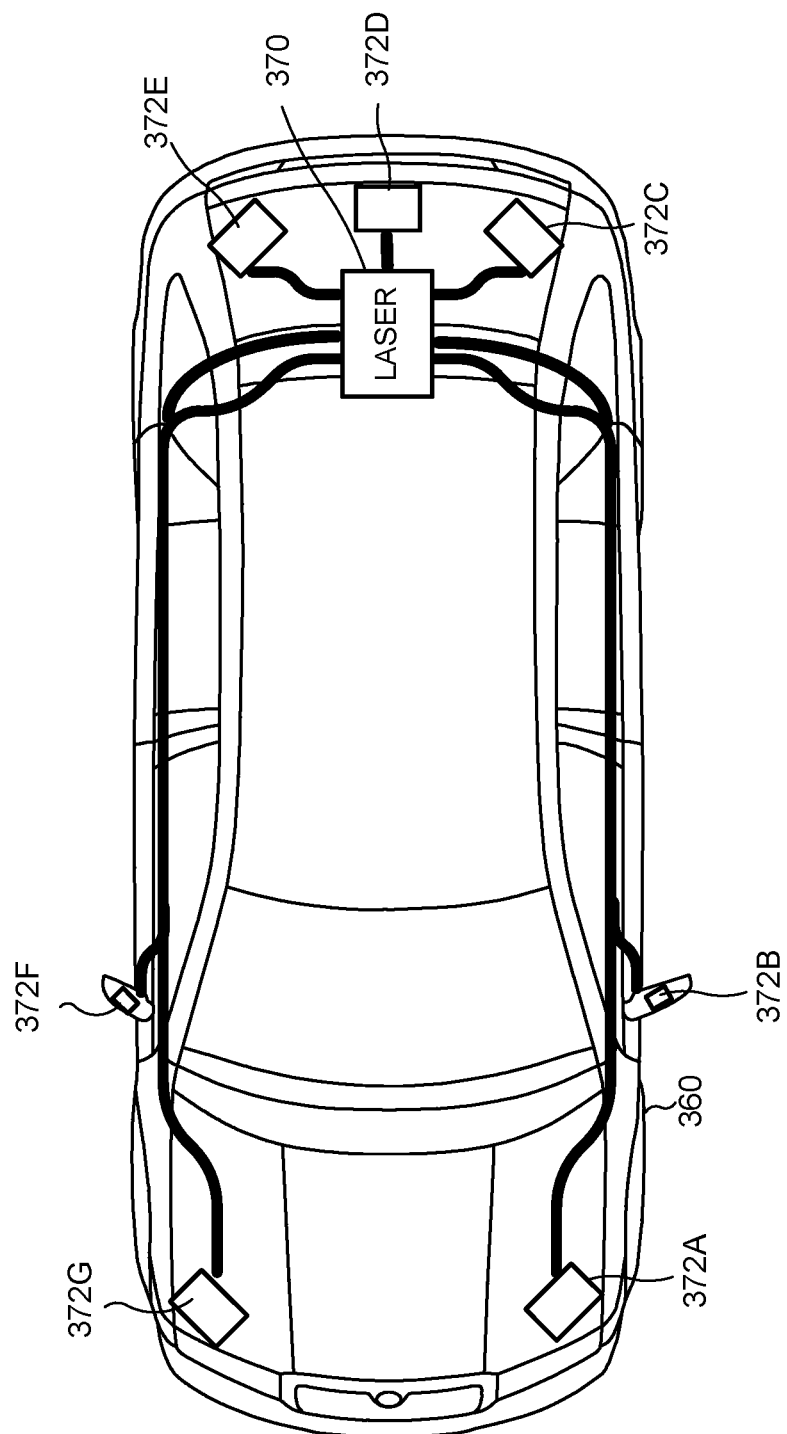
FIG. 3B illustrates another example vehicle in which the lidar system of FIG. 2 may operate.

As another example, FIG. 3B illustrates a vehicle 360 in which a laser 370 is optically coupled to six sensor heads 372, each of which may be similar to one of the sensor heads 312 of FIG. 3A. The sensor heads 372A and 372G are disposed at the front of the hood, the sensor heads 372B and 372F are disposed in the side view mirrors, and the sensor heads 372C-E are disposed on the trunk. In particular, the sensor head 372D is oriented to face backward relative to the orientation of the vehicle 360, and the sensor heads 372C-E are oriented at approximately 45 degrees relative to the axis of orientation of the sensor head 372D.

Figure 4:
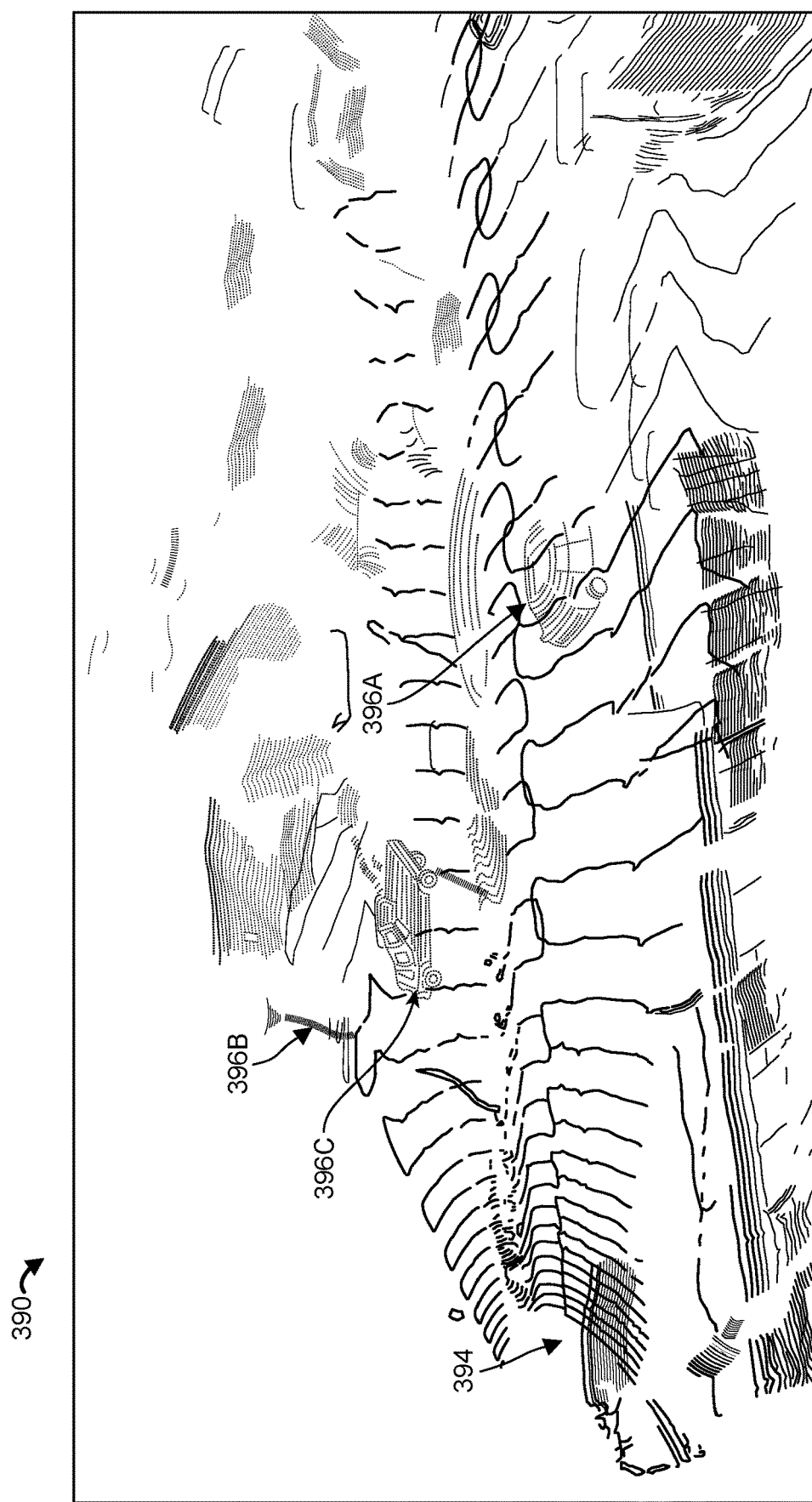
FIG. 4 illustrates an example point cloud that may be generated by the lidar system of FIG. 2 or 3.

FIG. 4 depicts an example point cloud 390 that is generated by a lidar system scanning the vehicle environment (e.g., the lidar system 100 of FIGS. 1 and 2 or the lidar system 302 of FIG. 3A). The vehicle environment may include a divided highway that has a median separating the two directions of traffic, with multiple lanes in each direction. The vehicle environment may also include light poles on either side of the road and/or in the median. The point cloud 390 of FIG. 4 corresponds to an example embodiment in which a lidar device captures a roughly 60 degree horizontal field of regard in front of the vehicle 300. The point cloud 390 may have been generated using the sensor heads 312A or 312D of FIG. 3A, or the sensor heads 372A or 372G of FIG. 3B, for example. While depicted as a visual image in FIG. 4, it is understood that, in some embodiments, the point cloud 390 is not actually rendered or displayed at any time.

As seen in FIG. 4, the point cloud 390 depicts a ground plane 394 (here, the road surface) as a number of substantially continuous scan lines, and also depicts, above the ground plane 394, a number of objects 396 (also referred to as "point cloud objects"). For clarity, only a small number of the objects shown in FIG. 4 are labeled with a reference number. Distinct ones of the objects 396 within the point cloud 390 may be identified by a segmentation module of the vehicle controller 322 of FIG. 3A. For example, the segmentation module may detect substantial gaps and/or other discontinuities in the scan lines of the ground plane 394, and identify groups of points in the vicinity of those discontinuities as discrete objects. The segmentation module may determine which points belong to the same object using any suitable rules, algorithms or models. Once the objects 396 are identified, a classification module of the vehicle controller 322 of FIG. 3A may attempt to classify the objects, and a tracking module of the vehicle controller 322 of FIG. 3A may attempt to track the classified objects (and, in some embodiments/scenarios, unclassified objects) across future point clouds similar to point cloud 390 (i.e., across multiple point cloud frames).

For various reasons, it may be more difficult for the segmentation module to identify certain objects 396, and/or for the classification module to classify certain objects 396, within the point cloud 390. As can also be seen in FIG. 4, for example, a vehicle 396A may be relativity easy to identify and classify due to the high density of points, but more difficult to classify due to the lack of points within the lidar shadow (i.e., the absence or relative scarcity of points) along the lower right portions of the vehicle 396C created by the relative positioning of the vehicle 396C with respect to the vehicle 300. A light pole 396B may also be relatively easy to identify as an object, due to the high density of points and readily identifiable shape, but may not be as easy to classify due to the fact that large portions of the light pole 396B are distorted (e.g., as shown by the middle portion leaning away from the vehicle 300). The van 396C may be relatively easy to identify as an object, but more difficult to classify due to distortion causing the van 396C to appears as though it is tilted away from the vehicle 300. Still other objects may be difficult to identify, classify and/or track due to their small size and/or low profile. For example, while not shown in FIG. 4, the segmentation module may identify (and the classification module may classify) lane markings within the point cloud 390. The lane markings may appear as small but abrupt deviations in the path of the scan lines, for example, with those deviations collectively forming a line pattern that aligns with the direction of travel of the autonomous vehicle (e.g., approximately normal to the curve of the scan lines).

Despite such difficulties, the segmentation module, classification module and/or tracking module may use techniques that make object identification, classification and/or tracking highly accurate across a very wide range of scenarios, with scarce or otherwise suboptimal point cloud representations of objects. For example, the segmentation module, classification module and/or tracking module may include neural networks that were trained using data (e.g., manually labeled scenes) corresponding to a very large number of diverse environments/scenarios (e.g., with various types of objects at different distances, in different orientations, with different degrees of concealment, in different weather and/or lighting conditions, and so on).

As another example, in embodiments in which the vehicle controller 322 of FIG. 3A detects object distortion, a distortion correction module of the vehicle controller 322 analyzes the identified objects 396 to detect and correct distortion. For example, as depicted in FIG. 4, the light pole 396B and the van 396C exhibit distortion causing the light pole 396B and van 396C to appear as though they are skewed away from the vehicle 300. Accordingly, the distortion correction module may detect the distortion, modify the point cloud 390 to correct for the distortion, analyze the distortion to determine the velocity of one or more objects 396, etc. Correcting the distortion of the objects 396 may improve the accuracy of the classification module and/or the tracking module (see description of FIG. 5, below), for example. Ultimately, improving the correlation between the point cloud 390 and the actual vehicle environment may provide a smoother ride for passengers and/or reduce the likelihood of a collision.

Example Vehicle Controllers

Figure 5:
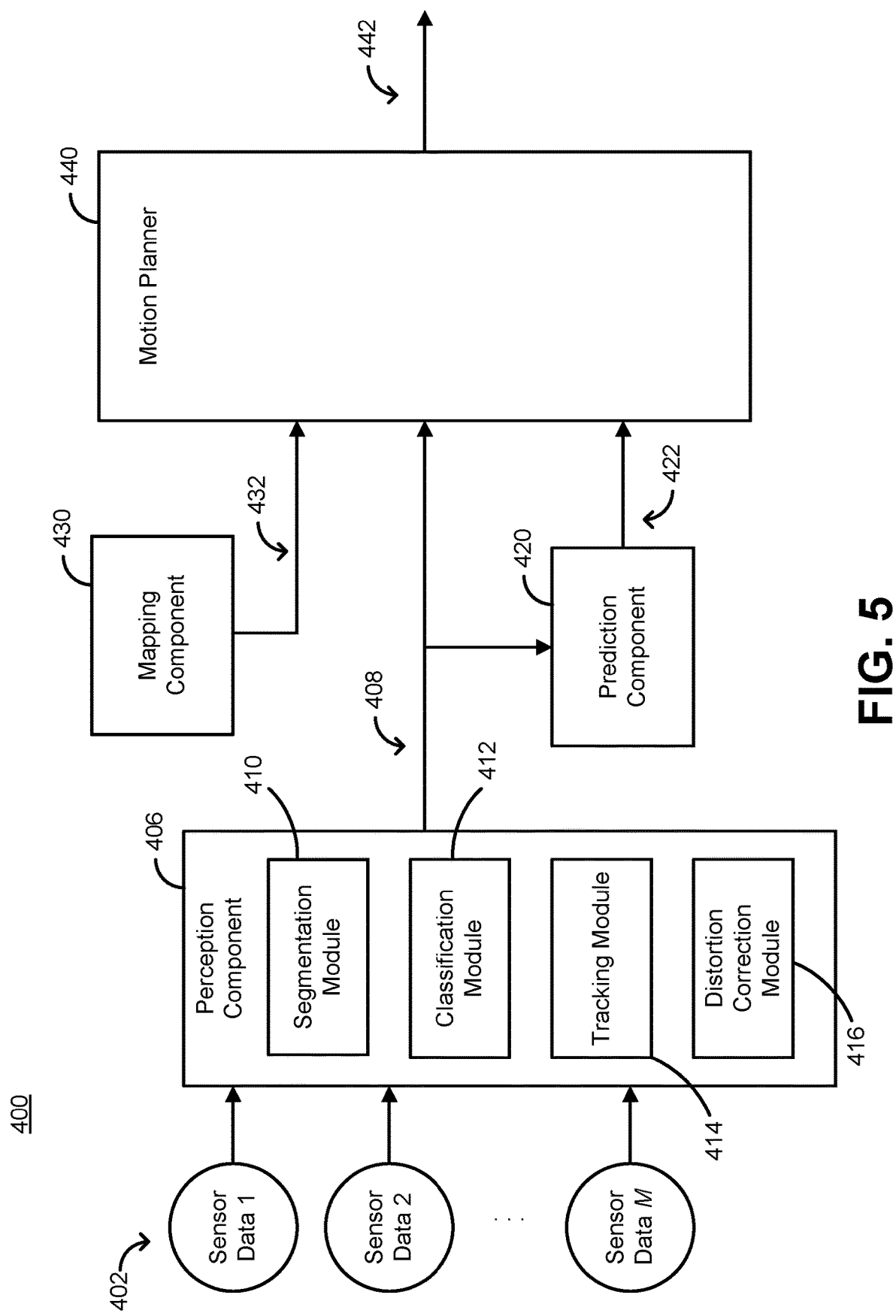
FIG. 5 is a block diagram of a software architecture that may be used in the lidar system of FIG. 2 or 3.

FIG. 5 illustrates an example software architecture 400, which may be utilized in the lidar system 100 or 302 of FIG. 2 or 3, respectively. The software architecture 400 receives as input M sets of sensor data 402 generated by M different sensors, with M being any suitable integer equal to or greater than one. The sensor data 402 may be data generated by the sensor heads 312 of FIG. 3 or any of the other non-illustrated sensors included in the lidar system 302 of FIG. 3. For example, in addition to the lidar sensor heads 312, the lidar system may include cameras, radar devices, thermal imaging units, IMUs, and/or other sensor types. In one example, "sensor data 1" may include frames of point cloud data generated by a first sensor head 312A, "sensor data 2" may include frames of point cloud data generated by a second sensor head 312B, "sensor data 3" (not shown in FIG. 3) may include frames of digital images generated by a RGB camera, and so on.

The sensor data 402 is input to a perception component 406 of the software architecture 400, and is processed by the perception component 406 to generate perception signals 408 descriptive of a current state of the autonomous vehicle's environment. It is understood that the term "current" may actually refer to a very short time prior to the generation of any given perception signals 408, e.g., due to the short processing delay introduced by the perception component 406 and other factors. To generate the perception signals, the perception component may include a segmentation module 410, a classification module 412, a tracking module 414, and a distortion correction module 416.

The segmentation module 410 is generally configured to identify distinct objects within the sensor data 402 representing the sensed environment. Depending on the embodiment and/or scenario, the segmentation task may be performed separately for each of a number of different types of sensor data, or may be performed jointly on a fusion of multiple types of sensor data. In some embodiments where lidar devices are used, the segmentation module 410 analyzes point cloud frames to identify subsets of points within each frame that correspond to probable physical objects in the environment. In other embodiments, the segmentation module 410 jointly analyzes lidar point cloud frames in conjunction with camera image frames to identify objects in the environment. Other suitable techniques, and/or data from other suitable sensor types, may also be used to identify objects. It is noted that, as used herein, references to different or distinct "objects" may encompass physical things that are entirely disconnected (e.g., with two vehicles being two different "objects"), as well as physical things that are connected or partially connected (e.g., with a vehicle being a first "object" and the vehicle's hitched trailer being a second "object").

The segmentation module 410 may use predetermined rules or algorithms to identify objects. For example, the segmentation module 410 may identify as distinct objects, within a point cloud, any clusters of points that meet certain criteria (e.g., having no more than a certain maximum distance between all points in the cluster, etc.). Alternatively, the segmentation module 410 may utilize a neural network that has been trained to identify distinct objects within the environment (e.g., using supervised learning with manually generated labels for different objects within test data point clouds, etc.), or another type of machine learning based model. For example, the segmentation module 410 may analyze the point cloud 390 of FIG. 4 to identify objects 396.

The classification module 412 is generally configured to determine classes (labels, categories, etc.) for different objects that have been identified by the segmentation module 410. Like the segmentation module 410, the classification module 412 may perform classification separately for different sets of the sensor data 402, or may classify objects based on data from multiple sensors, etc. Moreover, and also similar to the segmentation module 410, the classification module 412 may execute predetermined rules or algorithms to classify objects, or may utilize a neural network or other machine learning based model to classify objects. For example, the classification module 412 may classify the object 396C of FIG. 4 as a truck and the object 396A as a car.

In some implementations, the classification module 412 communicates with an object database (not depicted) that stores information associated with object types. For example, the object database may include information that indicates how an object of the corresponding object type should appear in a point cloud. In some implementations, this indication may be a generic model for an object of the particular type. As one example, an object database record for a particular model of car may include a three-dimensional model of the car, to which objects identified by the segmentation module 410 are compared during the classification process. In some additional implementations, the model includes indications of particular features of the object that have known shapes (e.g., a license plate, a tire, manufacturer emblem, etc.). As will be described below, this model of the object, including the particular features thereof, may be used to detect whether objects identified by the segmentation module 410 actually have a skewed shape, or instead have a distorted appearance in the point cloud frame due to rolling shutter distortion.

The tracking module 414 is generally configured to track distinct objects over time (e.g., across multiple lidar point cloud or camera image frames). The tracked objects are generally objects that have been identified by the segmentation module 410, but may or may not be objects that were classified by the classification module 412, depending on the embodiment and/or scenario. The segmentation module 410 may assign identifiers to identified objects, and the tracking module 414 may associate existing identifiers with specific objects where appropriate (e.g., for lidar data, by associating the same identifier with different clusters of points, at different locations, in successive point cloud frames). Like the segmentation module 410 and the classification module 412, the tracking module 414 may perform separate object tracking based on different sets of the sensor data 402, or may track objects based on data from multiple sensors. Moreover, and also similar to the segmentation module 410 and the classification module 412, the tracking module 414 may execute predetermined rules or algorithms to track objects, or may utilize a neural network or other machine learning model to track objects.

The distortion correction module 416 is generally configured to detect that an object is distorted, analyze distortion to determine a relative velocity of the object, and/or correct distorted objects such that they no longer appear distorted. In one implementation, newly identified objects by the segmentation module 410 are analyzed by the distortion correction module 416. In some embodiments, the distortion correction module 416 jointly analyzes lidar point cloud frames in conjunction with camera image frames to determine whether objects are distorted. In some implementations, the newly identified objects are analyzed by the distortion correction module 416 prior to the objects being analyzed by the classification module 412 and/or the tracking module 414. Additionally or alternatively, objects tracked by the tracking module 414 are analyzed by the distortion correction module 416 when the sensor data 402 indicates a new point cloud frame. In some embodiments, the distortion correction module 416 analyzes the amount of distortion of an object to determine a velocity or relative velocity of at least one of the distorted object, another object, or the vehicle. Moreover, and also similar to the segmentation module 410, the classification module 412, and the tracking module 414, the distortion correction module 416 may execute predetermined rules or algorithms, or may utilize a neural network or other machine learning model to detect distortion, correct distortion, and/or correlate an amount of distortion to relative velocity.

The software architecture 400 also includes a prediction component 420, which processes the perception signals 408 to generate prediction signals 422 descriptive of one or more predicted future states of the autonomous vehicle's environment. For a given object, for example, the prediction component 420 may analyze the type/class of the object (as determined by the classification module 412) along with the recent tracked movement of the object (as determined by the tracking module 414) to predict one or more future positions of the object. As a relatively simple example, the prediction component 420 may assume that any moving objects will continue to travel on their current direction and with their current speed, possibly taking into account first- or higher-order derivatives to better track objects that have continuously changing directions, objects that are accelerating, and so on. In some embodiments, the prediction component 420 also predicts movement of objects based on more complex behaviors. For example, the prediction component 420 may assume that an object that has been classified as another vehicle will follow rules of the road (e.g., stop when approaching a red light), and will react in a certain way to other dynamic objects (e.g., attempt to maintain some safe distance from other vehicles). The prediction component 420 may inherently account for such behaviors by utilizing a neural network or other machine learning model, for example. The prediction component 420 may be omitted from the software architecture 400, in some embodiments.

A mapping component 430 obtains map data (e.g., a digital map including the area currently being traversed by the autonomous vehicle) and/or navigation data (e.g., data indicating a route for the autonomous vehicle to reach the destination, such as turn-by-turn instructions), and outputs the data (possibly in a converted format) as mapping and navigation signals 432. In some embodiments, the mapping and navigation signals 432 include other map- or location-related information, such as speed limits, traffic indicators, and so on. The signals 432 may be obtained from a remote server (e.g., via a cellular or other communication network of the autonomous vehicle, or of a smartphone coupled to the autonomous vehicle, etc.), and/or may be locally stored in a persistent memory of the autonomous vehicle.

A motion planner 440 processes the perception signals 408, the prediction signals 422, and the mapping and navigation signals 432 to generate decisions 442 regarding the next movements of the autonomous vehicle. The motion planner 440 may use any suitable architecture or technique to generate the decisions 442, such as one or more trained machine learning models, or a model predictive control (MPC) technique, for example. Depending on the type of the motion planner 440, the decisions 442 may be operational parameters (e.g., braking, speed and steering parameters) or particular maneuvers (e.g., turn left, move to right lane, move onto shoulder of road, etc.). In some embodiments, the decisions 442 may be provided to one or more components of the autonomous vehicle (e.g., if the decisions 442 indicate specific operational parameters) such as the components 330 of FIG. 3, or may be provided to one or more intermediate stages that convert the decisions 442 to operational parameters (e.g., if the decisions indicate specific maneuvers) prior to providing the operation parameters to the vehicle components 330.

Figure 6:
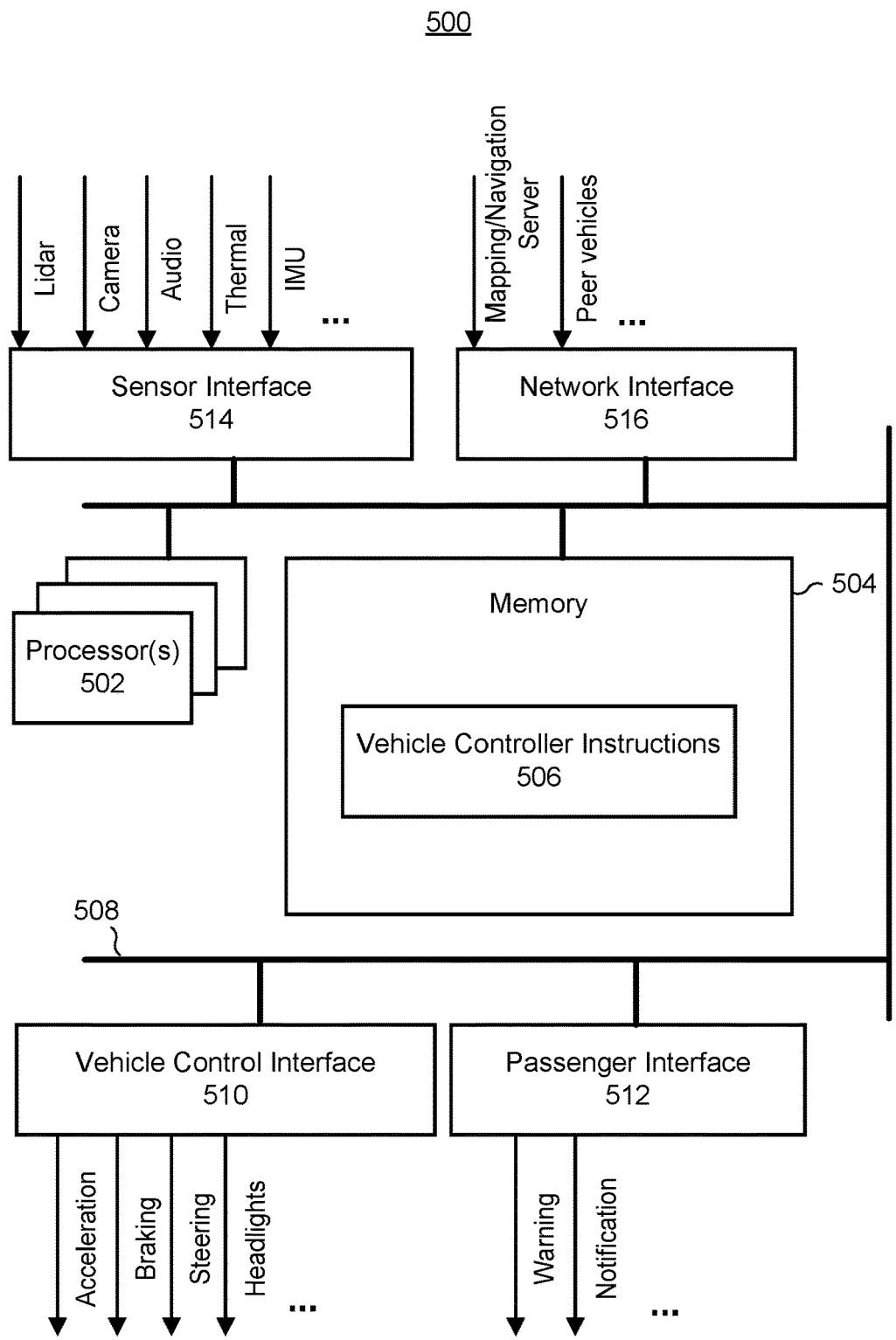
FIG. 6 is a block diagram of an example computing system for controlling an autonomous vehicle, which may be used in the lidar system of FIG. 2 or 3.

FIG. 6 is a block diagram of an example computing system 500 for controlling an autonomous vehicle. The computing system 500 may be integrated within an autonomous vehicle in any suitable manner, and at any suitable location or locations within the vehicle. The computing system 500 may be included, or partially included, within the vehicle controller 322 of FIG. 3, for example. The computing system 500 includes one or more processors 502, and a memory 504 storing vehicle controller instructions 506. The one or more processors 502 execute the vehicle controller instructions 506 to implement the disclosed techniques, including, in one embodiment, the software architecture 400 of FIG. 5.

In embodiments where the processor(s) 502 include more than a single processor, each processor may be a different programmable microprocessor that executes software instructions stored in the memory 504. Alternatively, each of the processor(s) 502 may be a different set of such microprocessors, or a set that includes one or more microprocessors and one or more other processor types (e.g., ASICs, FPGAs, etc.) for certain functions.

The memory 504 may include one or more physical memory devices with non-volatile memory. Any suitable memory type or types may be used, such as ROM, solid-state drives (SSDs), hard disk drives (HDDs), and so on. The processor(s) 502 are coupled to the memory 504 via a bus or other network 508. The network 508 may be a single wired network, or may include any suitable number of wired and/or wireless networks. For example, the network 508 may be or include a controller area network (CAN) bus, a Local Interconnect Network (LNN) bus, and so on.

Also coupled to the network 508 are a vehicle control interface 510, a passenger interface 512, a sensor interface 514, and a network interface 516. Each of the interfaces 510, 512, 514 and 516 may include one or more processors (e.g., ASICs, FPGAs, microprocessors, etc.) and/or other hardware, firmware and/or software to enable communication with systems, subsystems, devices, etc., that are external to the computing system 500.

The vehicle control interface 510 is generally configured to provide control data generated by the processor(s) 502 to the appropriate operational subsystems of the autonomous vehicle, such that the appropriate subsystems can effectuate driving decisions made by the processor(s) 502. Referring to FIG. 5, for example, the vehicle control interface 510 may provide the control signal operational parameters associated with the decisions 442 to the appropriate subsystem(s) (e.g., accelerator 340, brakes 342, and steering mechanism 346 of FIG. 3A). In some embodiments, the vehicle control interface 510 includes separate interface hardware, firmware and/or software for different operational subsystems.

The passenger interface 512 is generally configured to provide alerts, warnings, notifications, and/or other information to one or more passengers of the autonomous vehicle. In some embodiments where the vehicle is not fully autonomous (e.g., allowing human driving in certain modes and/or situations), the interface 512 may specifically provide such information to the driver (e.g., via dashboard indicators, etc.). As just one example, the passenger interface 512 may cause a display and/or speaker in the vehicle to generate an alert when the processor(s) 502 (executing the vehicle controller instructions 506) determine that a collision with another object is likely. As another example, the passenger interface 502 may cause a display in the vehicle to show an estimated time of arrival (ETA) to passengers. In some embodiments, the passenger interface 512 also permits certain user inputs. If the vehicle supports passenger selection of specific driving styles, for example, the passenger interface 512 may cause a display to present a virtual control (e.g., button) that a passenger may activate (e.g., touch, scroll through, etc.) to select a particular driving style.

The sensor interface 514 is generally configured to convert raw sensor data from one or more sensor devices (e.g., lidar, camera, microphones, thermal imaging units, IMUs, etc.) to a format that is consistent with a protocol of the network 508 and is recognized by one or more of the processor(s) 502. The sensor interface 514 may be coupled to the lidar system 100 of FIG. 1 or 2 or the lidar system 302 of FIG. 3A, for example, with the sensor interface 514 converting point cloud data to an appropriate format. In some embodiments, the sensor interface 514 includes separate interface hardware, firmware and/or software for each sensor device and/or each sensor type.

The network interface 516 is generally configured to convert data received from one or more devices or systems external to the autonomous vehicle to a format that is consistent with a protocol of the network 508 and is recognized by one or more of the processor(s) 502. In some embodiments, the network interface 516 includes separate interface hardware, firmware and/or software for different external sources. For example, a remote mapping/navigation server may send mapping and navigation/route data to the computing system 500 via a cellular network interface of the network interface 516, while one or more peer vehicles (e.g., other autonomous vehicles) may send data (e.g., current positions of the other vehicles) to the computing system 500 via a WiFi network interface of the network interface 516. Other types of external data may also, or instead, be received via the network interface 516. For example, the computing system 500 may use the network interface 516 to receive data representing rules or regulations (e.g., speed limits), object positions (e.g., road rails, overhanging signage, etc.), and/or other information from various infrastructure devices or systems.

In some embodiments, the vehicle controller instructions 506 utilize external data that is received by the network interface 516 from other vehicles, infrastructure, and/or other external devices/systems as an input to one or more components. In such an embodiment, the external data may include raw sensor data that is indicative of the vehicle environment (but was generated off-vehicle), and/or may include higher-level information that was generated externally using raw sensor data.

The network 508 may also couple to other types of interfaces and/or components, and/or some of the interfaces shown in FIG. 6 may be omitted (e.g., the network interface 516). Moreover, it is understood that the computing system 500 represents just one possible configuration for supporting the software architectures, functions, features, etc., described herein, and that others are also within the scope of this disclosure.

Example Method of Fitting Pixels to a Surface to Determine Relative Velocity

Figure 7:
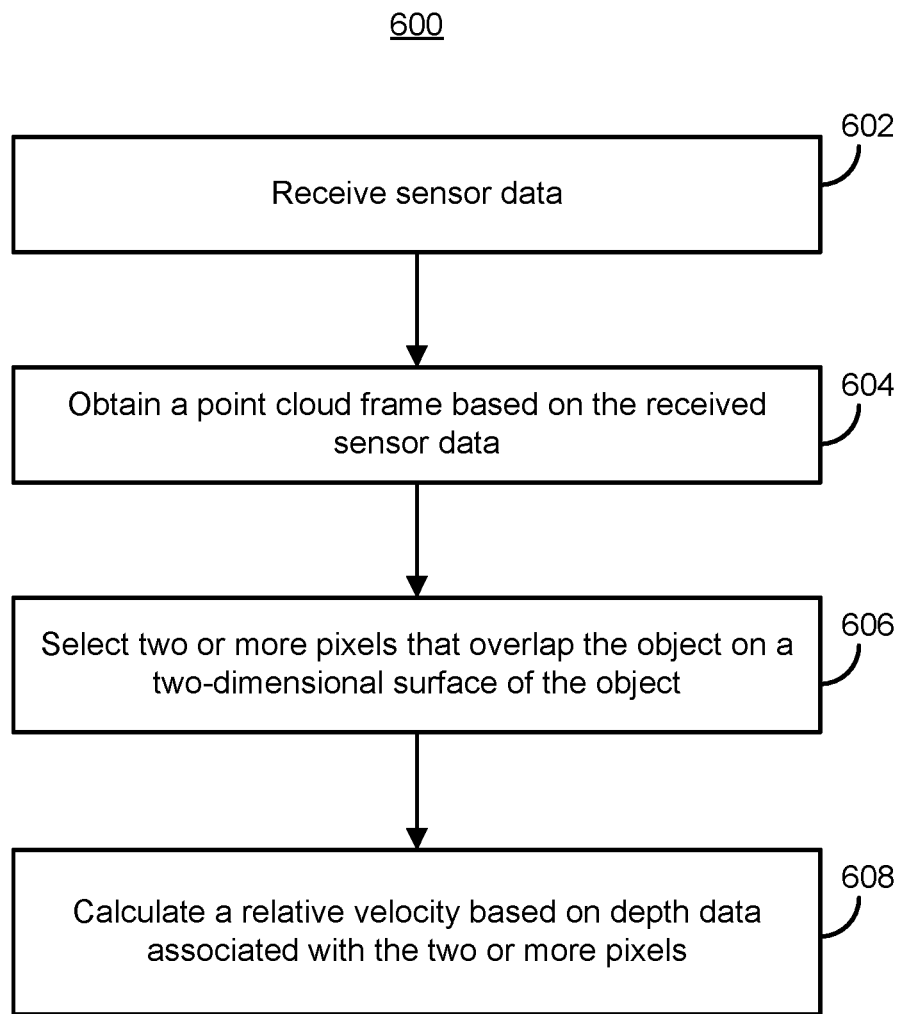
FIG. 7 is a flow diagram of an example method for determining relative velocity of a point cloud object by fitting pixels onto a surface of the point cloud object.

FIG. 7 depicts an example method 600 for determining the relative velocity of a point cloud object by fitting pixels onto a surface of the point cloud object, for example, one of the objects 396 of the point cloud 390 depicted in FIG. 4. The method 600 may be implemented/performed by the computing system 500 of FIG. 6 (e.g., by the processor(s) 502 when executing the vehicle controller instructions 506 stored in memory 504), for example, by another suitable computing device or system (such as a controller of the laser 310 or the sensor heads 312 of FIG. 3A, or the software architecture 400 of FIG. 5), or by a combination thereof.

At block 602, sensor data is received. The sensor data may include lidar depth data (e.g., sensed by the lidar system 100 of FIGS. 1 and 2, or the lidar system 302 of FIG. 3A), lidar point cloud data (e.g., stitched or compiled lidar depth data), camera data, and/or any other type of sensor data discussed above in connection with the sensor data 402 of FIG. 5, for example.

At block 604, a point cloud frame based on the sensor data received at block 602 is obtained. In some embodiments, the sensor data received at block 602 includes the point cloud frame (e.g., a laser controller or sensor head controller stitched depth data together to form the point cloud). In these embodiments, block 604 may include extracting the point cloud frame from rest of the sensor data received at block 602. In other embodiments, block 604 includes analyzing depth or lidar data included in the sensor data received at block 602 to generate the point cloud frame, as discussed in connection to FIG. 3, for example.

At block 606, two or more pixels that overlap a point cloud object are selected from the point cloud frame. In some implementations, the two points correspond to the same object as identified by a segmentation module. In other implementations, the two points are selected based on being within a threshold distance of one another. The selected points may be located on or near a two-dimensional surface corresponding to at least part of the point cloud object and captured at different times. Each of the pixels may be associated with depth data and time data. In one scenario, pixels 164a and 164b of FIG. 1A overlap the same point cloud object and are selected at block 606. In this scenario, the pixels 164a and 164b are fitted to a two-dimensional plane used to model the object's two-dimensional surface. The general equation for a plane moving through an environment is represented by the following equation:

$$a'(x-v_x t)+b'(y-v_y t)+c'(z-v_z t)+1=0 \quad \text{(Eq. 1)}$$

Accordingly, as it is generally used herein, "fitting" the pixels to a plane includes modeling the point cloud object's surface as a two-dimensional plane moving through the vehicle environment such that the pixels are included within (i.e., satisfy the equation for) the two-dimension plane.

At block 608, a relative velocity of the point cloud object is determined based on depth and time data associated with the selected pixels. In some implementations, it is assumed that the plane is not moving along the vertical axis with respect to the vehicle. Using this assumption, the motion of the two-dimensional plane may be represented using the following equation:

$$a'(x-v_x t)+b'(y-v_y t)+c'(z)+1=0 \quad \text{(Eq. 2)}$$

where a', b', and c' are constants, x, y, and z are indicative of position with respect to the x, y, and z axes (such as the longitudinal, lateral, and vertical axes), respectively, and $v_x$ and $v_y$ are the component of the plane velocity in the x and y directions respectively. To calculate relative velocity based on only the two selected pixels, it may be further assumed that the plane is not moving along the y-axis (e.g., lateral axis) and that the plane is oriented to be perpendicular to the x-axis (e.g., longitudinal axis). That is, it is assumed the plane is fixed in a vertical orientation and moving solely along the longitudinal axis. Using these additional assumptions, the equation of the plane may be represented as:

$$a'(x-v_x t)+1=0 \quad \text{(Eq. 3)}$$

The time and depth data associated with the first and second pixels can then be plugged into Equation 3 to solve for $v_x$ (as well as a'). That is, depth data $x_1$ captured at time $t_1$ and depth data $x_2$ captured at time $t_2$ associated with the first and second pixels is input into a best fit algorithm (such as a least square sum algorithm, a polynomial regression algorithm, etc.) to solve for $v_x$. Because it is assumed that the plane is only moving in the longitudinal direction, $v_x$ is the relative velocity of the point cloud object.

In other implementations, three or more pixels (such as pixels 164a, 164b, and 164c of FIG. 1A) are selected at block 606. In these implementations, the equation of the plane determined with respect to the first two selected pixels is rotated about a single axis to fit the third pixel into the plane. Said another way, rotating the plane about a single axis to fit the third pixel solves for one of b' or c'. Assuming that the other constant is 0, then Equation 1 can be solved for $v_x$ and $v_y$, or $v_x$ and $v_z$ (as well as a') using another best fit algorithm that utilizes the time and depth data for the three selected pixels as an input.

In still further implementations, four or more pixels (such as pixels 164a, 164b, 164c, and 164d of FIG. 1A) are selected at block 606. In these implementations, the equation of the plane determined with respect to the first two selected pixels is rotated about two axes to fit the third and fourth pixels into the plane. Said another way, rotating the plane about two axes to fit the third and fourth pixels solves for both of b' and c'. Accordingly, Equation 1 can be solved for $v_x$, $v_y$, and $v_z$ (as well as a') using another best fit algorithm that utilizes the time and depth data for the four selected pixels as an input.

In yet further implementations, rather than assuming the point cloud object is a plane, block 608 assumes that the point cloud object can have any shape. Thus, using the two selected pixels, the relative velocity of the point cloud object can be calculated using the following equation:

$$v = \frac{\Delta d}{\Delta t} \quad \text{(Eq. 4)}$$

where Δd is the depth difference between the two selected pixel and Δt is the time difference between when the depth data for the two pixels was captured. In some scenarios, the first and second pixels are part of the same scan line that traverses the vehicle environment. In other scenarios, the first pixel is part of a first scan line of pixels that are displaced from one another in a first direction and the second pixel is part of a second scan line of pixels that is substantially parallel to the first scan line and comprised of pixels that are displaced from one another in a second direction substantially orthogonal to the first direction.

In some embodiments, the method 600 includes one or more additional blocks not shown in FIG. 7. For example, in some embodiments, another two or more pixels that overlap the point cloud object in a different region may be selected. This additional block may then calculate a relative velocity of this different region using the techniques described above with respect to blocks 606 and 608. Accordingly, this additional block may include comparing the two different relative velocities for the two different regions to determine that the point cloud object is rotating with respect to the vehicle, for example, by determining that the relative velocities are not the same.

As another example, the method 600 may include a block to detect that the point cloud object is distorted. Accordingly, at block 606, two or more pixels that are part of a scan line that traverses the vehicle environment in a first direction (e.g., pixels 164a and 164b of FIG. 1A) and two or more pixels that are part of a scan line that traverses the vehicle environment in a second direct (e.g., pixels 164c and 164d)

are selected. This additional block may include calculating a first relative velocity using the first two pixels and a second relative velocity using the second two pixels, for example by using Equation 4. Accordingly, if the polarity of the relative velocities do not match (e.g., the depth at pixel 164*a* minus the depth at pixel 164*b* has a different polarity than the depth at pixel 164*c* minus the depth at pixel 164*d*), then the point cloud object exhibits rolling shutter distortion. Additionally or alternatively, this additional block includes comparing the magnitude of the two relative velocities. In some aspects, a rate of change between the relative velocities is analyzed to determine a relative acceleration. In other aspects, when the two relative velocities have approximately the same magnitude, it is likely that all four pixels overlap the point cloud object. Therefore, one of the first relative velocity, the second relative velocity, or an average relative velocity therebetween is associated with the point cloud object, for example, by the perception component 406 of FIG. 5. It should be appreciated that if the magnitude of one of the relative velocities exceeds a threshold value, then it is likely that one of the pixels does not actually overlap the point cloud object. Therefore, relative velocities that exceed this threshold may be discarded.

As another additional block, the method 600 may include correcting the rolling shutter distortion based on the relative velocity determined at block 608. For example, a machine learning module (e.g., one that is trained using reinforcement learning) may associate an amount of distortion to relative velocity and point cloud object depth. In particular, the machine learning model may operate on (i.e., use as inputs) the relative velocity determined at block 608 and the depth data of the selected pixels to determine a correction factor to compensate for delay introduced by successive pixels and/or scan lines included in a scan pattern.

Another additional block of the method 600 may include determining an object velocity (as opposed to relative velocity). For example, a relative velocity of a point cloud object that is known to be stationary (e.g., the point cloud object is classified as a light pole, a street sign, a tree, a bench, a power line, a building, a median, etc.) may be determined using the techniques of blocks 606 and 608. Because the point cloud object is known to be stationary, the relative velocity is comprised solely of the vehicle's velocity. Said another way, by determining the relative velocity with respect to a known, stationary object, the vehicle velocity can be determined. Subsequently, the vehicle velocity can be subtracted from the relative velocity determined with respect to the identified point cloud object to determine object velocity.

As still another example additional block, the point cloud object (either corrected or uncorrected) and the relative velocity may be analyzed, for example by a portion of the perception component 406 of FIG. 5 (e.g., classification module 412 and/or tracking module 414) and/or the prediction component 420 of FIG. 5, to classify the object, track the object, and/or predict a future state of the vehicle environment. This additional block may further include generating one or more control signals (e.g., operational parameters) that control operation of the vehicle and/or the particular components thereof based on the current perceived state and/or the predicted future state. As one example, if the relative velocity indicates that the point cloud object is rapidly increasing its speed in the direction towards the vehicle along the longitudinal axis, then the block may include generate a control signal to apply the vehicle brakes.

Example Methods of Determining Relative Velocity Based on Distortion

Figure 8:
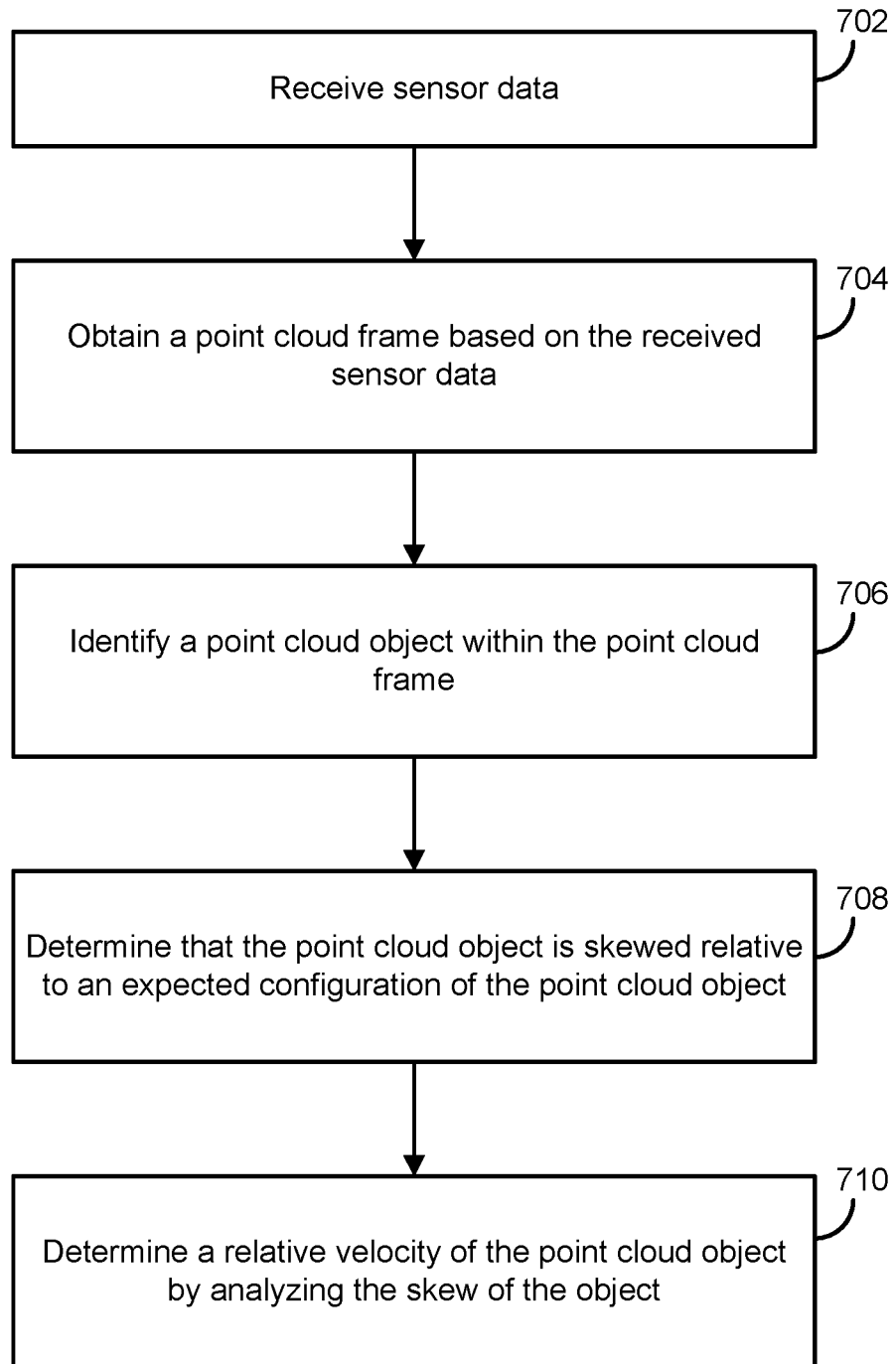
FIG. 8 is a flow diagram of an example method for determining relative velocity of a point cloud object by analyzing a skew of the point cloud object.
Figure 9:
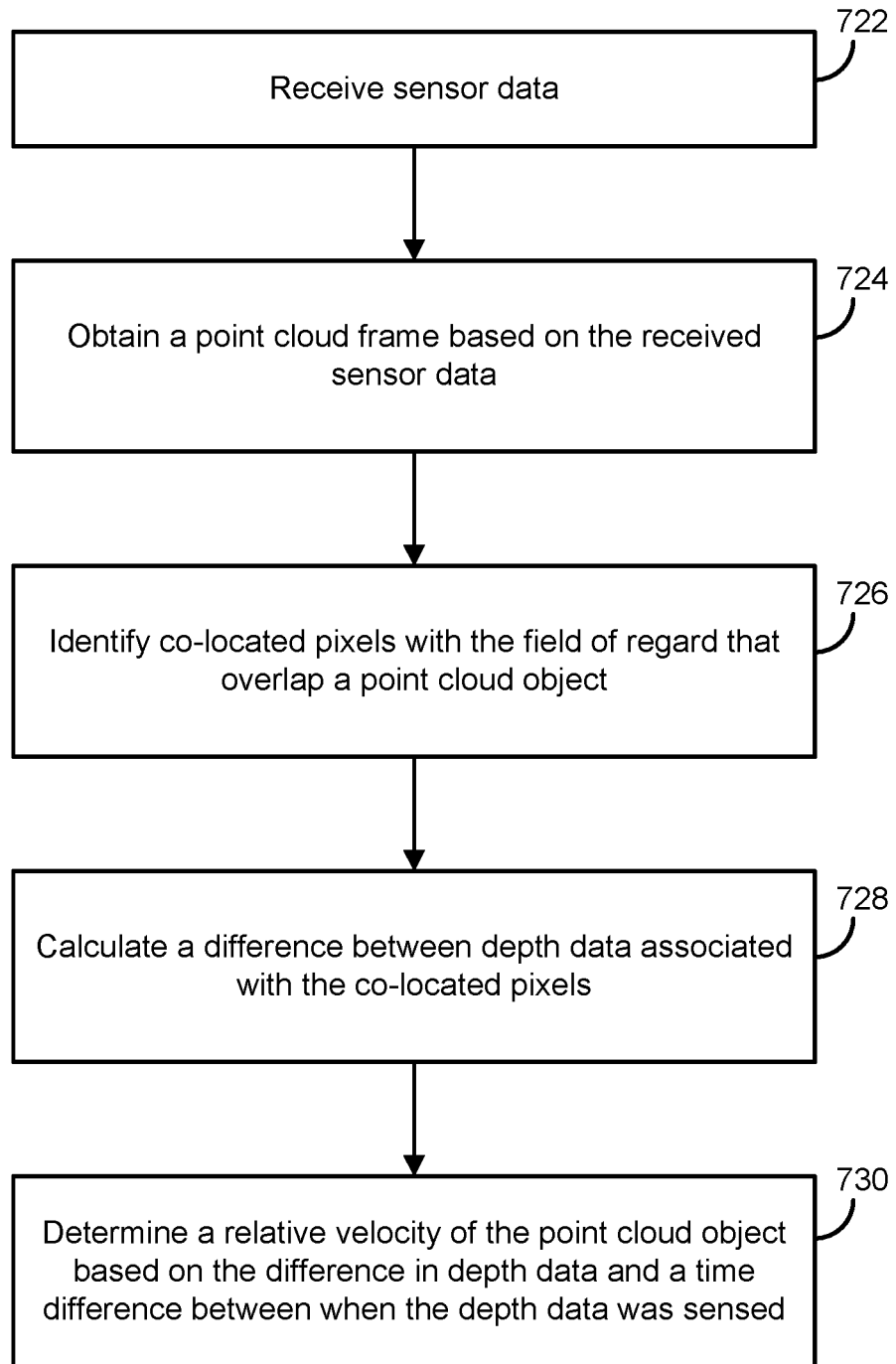
FIG. 9 is a flow diagram of an example method for determining relative velocity of a point cloud object using co-located pixels.
Figure 10:
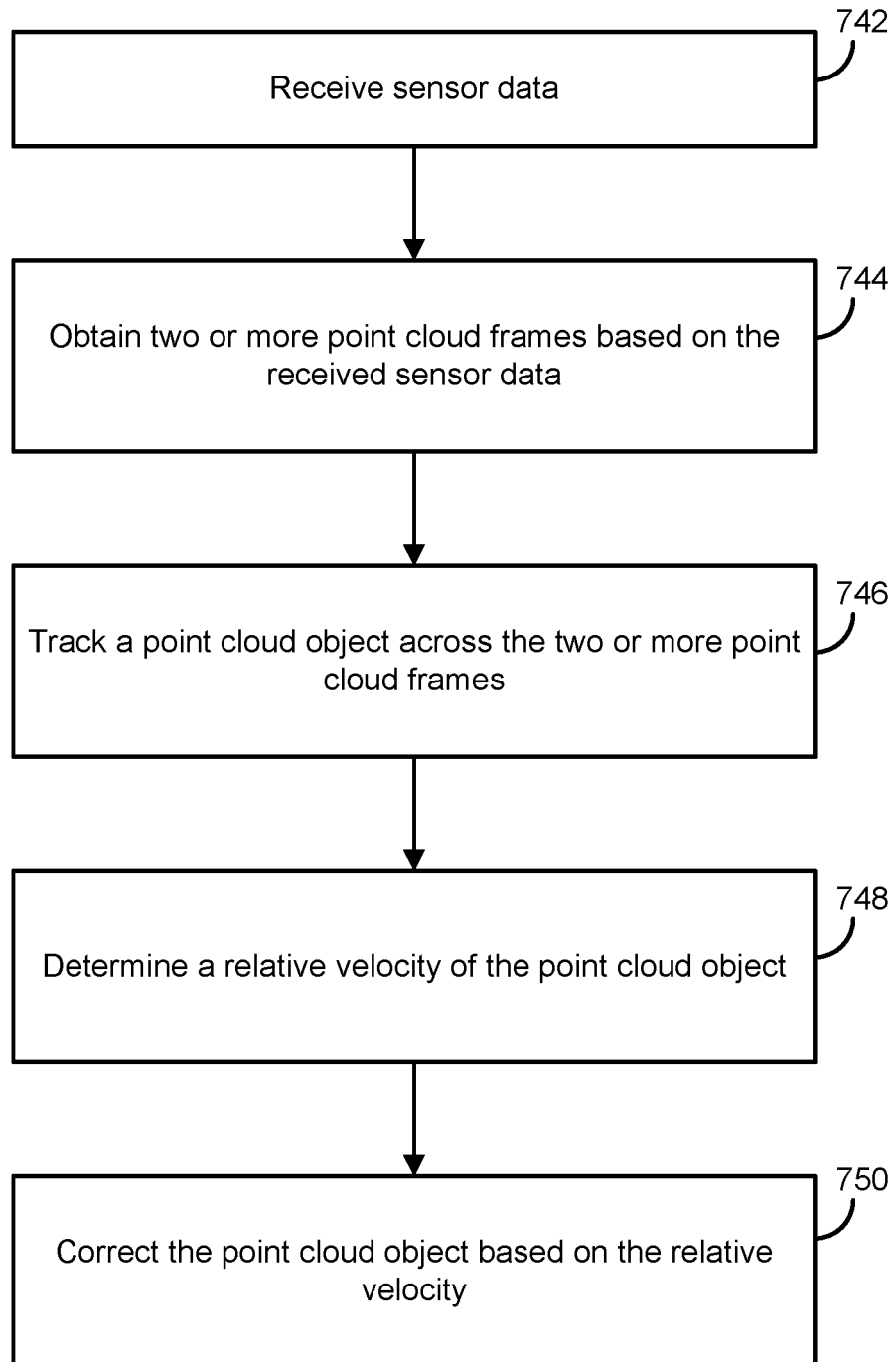
FIG. 10 is a flow diagram of an example method for correcting point cloud distortion based on tracked object velocity.

FIGS. 8, 9, and 10 depict example methods 700, 720, and 740, respectively, for determining the relative velocity of a point cloud object, for example, one of the objects 396 of the point cloud 390 depicted in FIG. 4. The method 700 of FIG. 8 relates to embodiments that determine relative velocity based on a scan pattern that includes successive scan lines that overlap the object, while the method 720 of FIG. 9 relates to embodiments that determine relative velocity based on depth data associated with co-located pixels. Both of the methods 700 and 720 rely on data captured during a single point cloud frame. On the other hand, the method 740 of FIG. 10 relates to embodiments that correct point cloud distortion based on tracked object velocity. The methods 700, 720, and 740 may be implemented/performed by the computing system 500 of FIG. 6 (e.g., by the processor(s) 502 when executing the vehicle controller instructions 506 stored in memory 504), for example, by another suitable computing device or system (such as a controller of the laser 310 or the sensor heads 312 of FIG. 3A, or the software architecture 400 of FIG. 5), or by a combination thereof.

Referring first to the method 700 of FIG. 8, sensor data is received at block 702. The sensor data may include lidar depth data (e.g., sensed by the lidar system 100 of FIGS. 1 and 2, or the lidar system 302 of FIG. 3A), lidar point cloud data (e.g., stitched or compiled lidar depth data), camera data, and any other type of sensor data discussed above in connection with the sensor data 402 of FIG. 5, for example.

At block 704, a point cloud frame based on the sensor data received at block 702 is obtained. In some embodiments, the sensor data received at block 702 includes the point cloud frame (e.g., a laser controller or sensor head controller stitched depth data together to form the point cloud). In these embodiments, block 704 includes extracting the point cloud frame from the rest of the sensor data received at block 702. In other embodiments, block 704 includes analyzing depth or lidar data included in the sensor data received at block 702 to generate the point cloud frame, as discussed in connection to FIG. 3, for example.

At block 706, a point cloud object within the point cloud frame obtained at block 704 is identified. In some embodiments, block 706 includes partitioning the point cloud frame into portions in accordance with probable boundaries between separate physical objects, determining object types/classes for at least some of those portions, and/or tracking movement of classified objects over time, for example, by utilizing a perception component 406 of the vehicle controller 400 of FIG. 5. In one example, a tracking module 414 of the perception component 406 tracks objects across multiple point cloud frames. In this example, the tracking module 414 identifies objects within the point cloud frame obtained at block 704 that are currently being tracked. In another example, the segmentation module 410 identifies a new object that is not being tracked by the tracking module 416.

At block 708, the point cloud object identified at block 706 is determined to be skewed relative to an expected configuration of the point cloud object. For example, the point cloud object may be skewed due to the above-described rolling shutter distortion. In some implementations, the point cloud object is classified (for example by a classification module 412 of the perception component 406) as an object that has a particular shape (e.g., an Acme Sedan, a stop sign, a person, etc.). Accordingly, determining that the object is skewed may include comparing a bound of the point cloud object to a bound of a reference object associated with the classification module.

In some implementations, the expected configuration is determined based upon the relative position between the vehicle and the object. For example, the classification module 412 may associate the point cloud object with a generic object of the same type of object. The generic object may be rotated and/or scaled based on the determined relative position to determine the expected configuration of the point cloud object. Skew may then be determined by comparing the expected configuration and the apparent/sensed configuration, and identifying a substantial difference (e.g., greater than a threshold difference) between the two. In other implementations and/or scenarios, it is determined that the object is skewed because a bound of the point cloud object is determined to be curved when it is known that the point cloud object should instead have a straight bound. For example, the classification module 412 may have classified the point cloud object as a type associated with a rule that side bounds should be approximately vertical (e.g., a truck container). Thus, the expected configuration of that bound is a line.

In yet other implementations, the expected configuration is determined based upon map data of the environment through which the vehicle is moving. For example, as illustrated in FIG. 6, the vehicle controller may be configured to receive mapping data via the network interface 516. The mapping data may include a plurality of images associated with location and/or geoposition data. Accordingly, for objects that are stationary and/or are generally permanent in the environment, the mapping data may include image data that is representative of the actual configuration of the object. Thus, based on positioning data received over a vehicle bus and a relative position of the point cloud object with respect to the vehicle, the representation of the object as included in the mapping data can be identified. As a result, instead of identifying and/or classifying the point cloud object as a particular type of object and rotating and/or scaling the generic object, the point cloud object may be compared to the corresponding representation in the mapping data to determine a relative viewing angle between the point cloud frame and the representation in the map data. Based on this relative viewing angle, the point cloud object may be rotated and/or scaled such that the point cloud object and the map data are analyzed from the same perspective.

At block 710, the relative velocity of the point cloud object identified at block 706 is determined by analyzing the skew of the object. For example, a machine learning model (e.g., trained using reinforcement learning) may associate an amount of skew to relative velocity. In particular, the machine learning model may operate on (i.e., use as inputs) the point cloud object identified at block 706 and the expected configuration.

In some scenarios, the point cloud object identified at block 706 is skewed along multiple axes. Accordingly, the skew with respect to each axis may be analyzed to determine the components of the velocity vector with respect to each of these axes. For example, a lateral skew is analyzed to determine a lateral component of the relative velocity and a longitudinal skew is analyzed to determine a longitudinal component of the relative velocity. Accordingly, the machine learning model may analyze lateral bounds of the point cloud object and the expected configuration to detect the lateral skew and longitudinal bounds of the point cloud object and the expected configuration to detect the longitudinal skew. In some implementations, the tracking module 414, for example, associates the determined relative velocity with the point cloud object.

In some embodiments, the method 700 includes one or more additional blocks not shown in FIG. 8. For example, in some embodiments, the sensor data received at block 702 includes velocity data indicative of the vehicle velocity (such as velocity data included in component reporting messages transmitted over a vehicle bus). In this example, the method 700 may include an additional block where the vehicle velocity is subtracted from the relative velocity determined at block 710 to determine the velocity of the point cloud object. As another example, the method 700 may include correcting the skew based on the relative velocity determined at block 710. To this end, the point cloud object may be adjusted to align with the expected configuration. As yet another example, the point cloud object (either corrected or uncorrected) and the relative velocity may be analyzed, for example by the prediction component 420 of FIG. 5, to predict a future state of the vehicle environment. This additional block may further include generating one or more control signals (e.g., operational parameters) that control operation of the vehicle and/or the particular components thereof based on the predicted future state. As one example, if the relative velocity indicates that the point cloud object is rapidly increasing its speed in the direction towards the vehicle along the longitudinal axis, then the block may include generate a control signal to apply the vehicle brakes.

FIG. 9 depicts an example method 720 for determining relative velocity of a point cloud object based on depth data associated with co-located pixels. In one implementation, the lidar system (such as the lidar system 100 of FIGS. 1 and 2) is configured to follow a scan pattern that includes co-located pixels, for example, the co-located pixels 166 include in scan pattern 160 of FIG. 1B. In additional or alternative implementations, the sensor heads 312A and 312D of the lidar system 302 of FIG. 3A are configured to implement complimentary, overlapping scan patterns wherein at least one pixel from the scan pattern implemented by the sensor head 312A is co-located with at least one pixel from the scan pattern implemented by the sensor head 312D. In these implementations, the scan patterns are configured such that the depth data associated with the co-located pixels are not obtained at the same time.

The method 720 begins with receiving sensor data at block 722. The sensor data may include lidar depth data (e.g., sensed by the lidar system 100 of FIGS. 1 and 2, or the lidar system 302 of FIG. 3A), lidar point cloud data (e.g., stitched or compiled lidar depth data), camera data, and any other type of sensor data discussed above in connection with the sensor data 402 of FIG. 5, for example. Block 722 may be the same or similar to block 702 of the method 700.

At block 724, a point cloud frame based on the sensor data received at block 722 is obtained. In some embodiments, the sensor data received at block 722 includes the point cloud frame (e.g., a laser controller or sensor head controller stitched depth data together to form the point cloud). In these embodiments, block 724 may include extracting the point cloud frame from the rest of the sensor data received at block 722. In other embodiments, block 724 includes analyzing depth or lidar data included in the sensor data received at block 722 to generate the point cloud frame, as discussed in connection to FIG. 3, for example. Block 724 may be the same or similar to block 704 of the method 700.

At block 726, co-located pixels within the field of regard that overlap a point cloud object within the point cloud frame obtained at block 724 are identified. In some embodiments, block 726 includes partitioning the point cloud frame into portions in accordance with probable boundaries between separate physical objects, determining object types/classes for at least some of those portions, and tracking movement of classified objects over time, for example, by utilizing a perception component 406 of the software architecture 400 of FIG. 5. In one example, a tracking module 414 of the perception component 406 tracks objects across multiple point cloud frames. In this example, the tracking module 414 identifies objects within the point cloud frame obtained at block 724 that are currently being tracked. In another example, the segmentation module 410 identifies a new object that is not being tracked by the tracking module 416. In any event, after any point cloud objects included in the cloud frame have been identified, block 726 includes determining that a pair of co-located pixels overlaps one of the point cloud objects.

At block 728, depth data associated with the co-located pixels are analyzed to determine a depth difference (Δd). Generally, Δt is indicative of the time span between capturing/sensing the depth data associated with the two co-located pixels, and Δd is indicative of the distance the object moved, relative to the vehicle and either towards or away from the vehicle, during the time span Δt. Accordingly, at block 730, relative velocity of the object may be determined by based on Δd and Δt. More particularly, in some implementations, the relative velocity is determined by dividing Δd by Δt. In some embodiments, the lidar system 100 includes a clock that time stamps the depth data when it is sensed at the receiver 140. Said another way, blocks 728 and 730 may implement Equation 4 using the depth and time data associated with the co-located pixels as inputs. Further, if Δd is determined at block 728 by subtracting the depth data of the later-sensed co-located pixel from the depth data of the earlier-sensed co-located pixel, the polarity of Δd is indicative of the direction of travel of the point cloud object. In particular, when Δd is a positive number, the point cloud object is moving away from the vehicle and, conversely, when Δd is a negative number, the point cloud object is moving towards the vehicle.

In some embodiments, the method 720 includes one or more additional blocks not shown in FIG. 9. For example, in some embodiments, the sensor data received at block 722 includes velocity data indicative of the vehicle velocity (such as velocity data included in component reporting messages transmitted over a vehicle bus). In this example, the method 720 may include an additional block where the vehicle velocity is subtracted from the relative velocity determined at block 730 to determine the velocity of the point cloud object.

As another example, an additional block may include identifying a second set of co-located pixels that overlap the point cloud object at a different region of the point cloud object. This block may include determining a relative velocity of the point cloud object based on the second set of co-located pixels. The two relative velocities may then be compared to one other to detect whether the point cloud object is turning or rotating.

Another additional block may include correcting rolling shutter distortion based on the relative velocity determined at block 730. To this end, the point cloud object may be adjusted to compensate for the motion of the point cloud object during the collection of depth data that comprises the point cloud frame. For example, a machine learning module (e.g., trained using reinforcement learning) may associate an amount of distortion to relative velocity and point cloud object depth. In particular, the machine learning model may operate on (i.e., use as inputs) the relative velocity determined at block 730 and the depth data of the co-located pixels to determine a correction factor to compensate for delay introduced by successive pixels and/or scan lines included in a scan pattern.

Another additional block of the method 600 may include determining an object velocity (i.e. the object's absolute velocity, as opposed to its relative velocity). For example, a relative velocity of a point cloud object that is known to be stationary (e.g., the point cloud object is classified as a light pole, a street sign, a tree, a bench, a power line, a building, a median, etc.) may be determined using the techniques of blocks 606 and 608. Because the point cloud object is known to be stationary, the relative velocity is comprised solely of the vehicle's velocity. Said another way, by determining the relative velocity with respect to a known, stationary object, the vehicle velocity can be determined. Subsequently, the vehicle velocity can be subtracted from the relative velocity determined with respect to the identified point cloud object to determine object velocity.

As yet another example, the point cloud object (either corrected or uncorrected) and the relative velocity may be analyzed, for example by the prediction component 420 of FIG. 5, to predict a future state of the vehicle environment. This additional block may further include generating one or more control signals (e.g., operational parameters) that control operation of the vehicle and/or the particular components thereof based on the predicted future state. As one example, if the relative velocity indicates that the point cloud object is rapidly increasing its speed in the direction towards the vehicle along the longitudinal axis, then the block may include generate a control signal to apply the vehicle brakes.

FIG. 10 depicts an example method 740 for correcting point cloud distortion based on tracked object velocity. Whereas the methods 700 and 720 determine the relative velocity of the point cloud object based on a single point cloud frame, the method 740 determines the relative velocity of the point cloud object across multiple point cloud frames. Accordingly, while this increases the time it takes to determine a relative velocity of a newly detected point cloud object, already-tracked objects may be associated with historic position data. Thus, by comparing a point cloud object as represented in a new point cloud frame to the historic position data, the relative velocity of an already-tracked object can be determined based on a single successive point cloud frame.

The method 740 begins when sensor data is received at block 742. The sensor data may include lidar depth data (e.g., sensed by the lidar system 100 of FIGS. 1 and 2, or the lidar system 302 of FIG. 3A), lidar point cloud data (e.g., stitched or compiled lidar depth data), camera data, and any other type of sensor data discussed above in connection with the sensor data 402 of FIG. 5, for example. Block 742 may be the same or similar to performing block 702 of the method 700, but with respect to subsequent sets of sensor data.

At block 744, two or more point cloud frames based on the sensor data received at block 742 are obtained. In some embodiments, the sensor data received at block 742 includes the point cloud frames (e.g., a laser controller or sensor head controller stitched depth data together to form the point cloud). In these embodiments, block 744 may include extracting the point cloud frames from rest of the sensor data received at block 742. In other embodiments, block 744 includes analyzing multiple sets of depth or lidar data included in the sensor data received at block 742 to generate the point cloud frames, as discussed in connection with FIG. 3, for example. Block 744 may be the same or similar to performing block 704 of the method 700, but with respect to subsequent sets of sensor data.

At block 746, a point cloud object is tracked across the two or more point cloud frames. In some embodiments, block 746 includes partitioning a first point cloud frame into portions in accordance with probable boundaries between separate physical objects, determining object types/classes for at least some of those portions, and tracking movement of the classified objects over time, for example, by utilizing a perception component 406 of the vehicle controller 400 of FIG. 5. In one example, a tracking module 414 of the perception component 406 tracks objects across multiple point cloud frames. More particularly, the tracking component 414 may associate tracked objects with position data (such as a position within the field of regard, a position in the vehicle environment, and/or a position relative to the vehicle), shape data, orientation data, or other information. In various implementations, the position data may be indicative of one or more of a position of the centroid of the point cloud object, a particular feature of the point cloud object, or a particular bound of the point cloud object. In this example, the point cloud object identified in the first point cloud object can be detected in the second point cloud frame (i.e., tracked across the first and second point cloud frames) using the associated shape or orientation information.

At block 748, a relative velocity of the point cloud object tracked at block 746 is determined. In one example, the position data of the point cloud object as represented in the first point cloud frame is subtracted from the position data of the point cloud object as represented in the second point cloud frame. This difference is divided by the time difference between the first and second point cloud frames to determine the relative velocity of the tracked object.

At block 750, rolling shutter distortion associated with the point cloud object tracked at block 746 is corrected based on the relative velocity determined at block 748. To correct the point cloud object, in one example, a machine learning module (e.g., trained using reinforcement learning) may associate an amount of distortion to relative velocity and point cloud object position information. In particular, the machine learning model may operate on (i.e., use as inputs) the relative velocity determined at block 748 and position information associated with the point cloud object to determine a correction factor to compensate for delay introduced by successive pixels and/or scan lines included in a scan pattern. Accordingly, based on the scan pattern utilized to capture the point cloud data, the correction factor is applied to the tracked point cloud object to correct for the rolling shutter distortion.

As another example, a relative velocity of a point cloud object that is known to be stationary (e.g., the point cloud object is classified as a light post, a street sign, a tree, a bench, a power line, a building, a median, etc.) is determined using the techniques of blocks 746 and 748 and/or the techniques of blocks 606 and 608 of the method 600. Because the point cloud object is known to be stationary, the relative velocity is comprised solely of the vehicle's velocity. Said another way, by determining the relative velocity with respect to a known, stationary object, the vehicle velocity can be determined. Subsequently, the vehicle velocity can be subtracted from the relative velocity determined with respect to the identified point cloud object to determine object velocity.

In some embodiments, the method 740 includes one or more additional blocks not shown in FIG. 10. For example, in some embodiments, the sensor data received at block 742 includes velocity data indicative of the vehicle velocity (such as velocity data included in component reporting messages transmitted over a vehicle bus). In this example, the method 740 may include an additional block where the vehicle velocity is subtracted from the relative velocity determined at block 748 to determine the velocity of the point cloud object. As another example, the corrected point cloud object and the relative velocity may be analyzed, for example by the prediction component 420 of FIG. 5, to predict a future state of the vehicle environment. This additional block may further include generating one or more control signals (e.g., operational parameters) that control operation of the vehicle and/or the particular components thereof based on the predicted future state.

Example Methods for Detecting that an Object is Distorted

Figure 11:
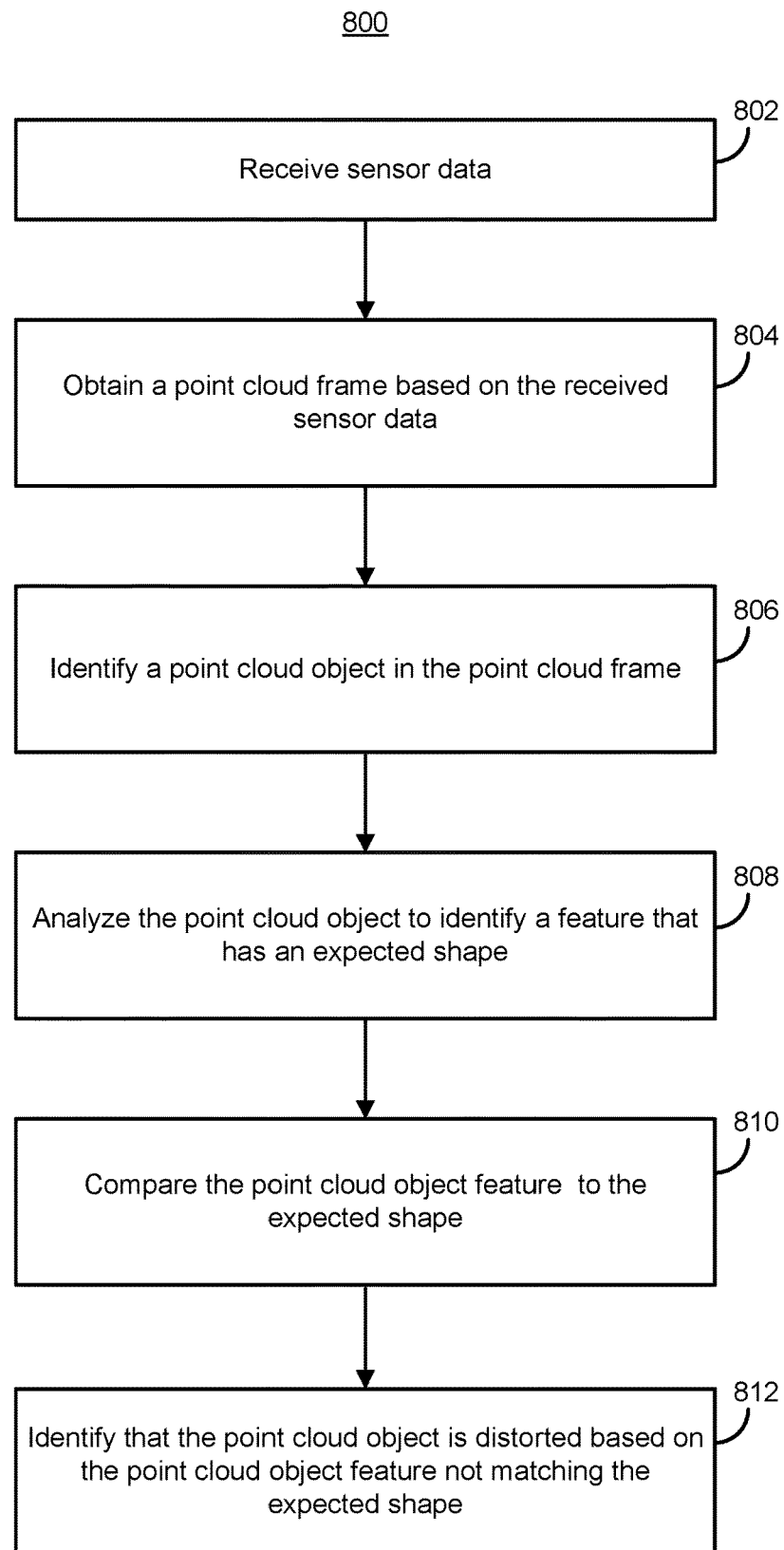
FIG. 11 is a flow diagram of an example method for detecting that a point cloud object is distorted using features having a known shape.
Figure 12:
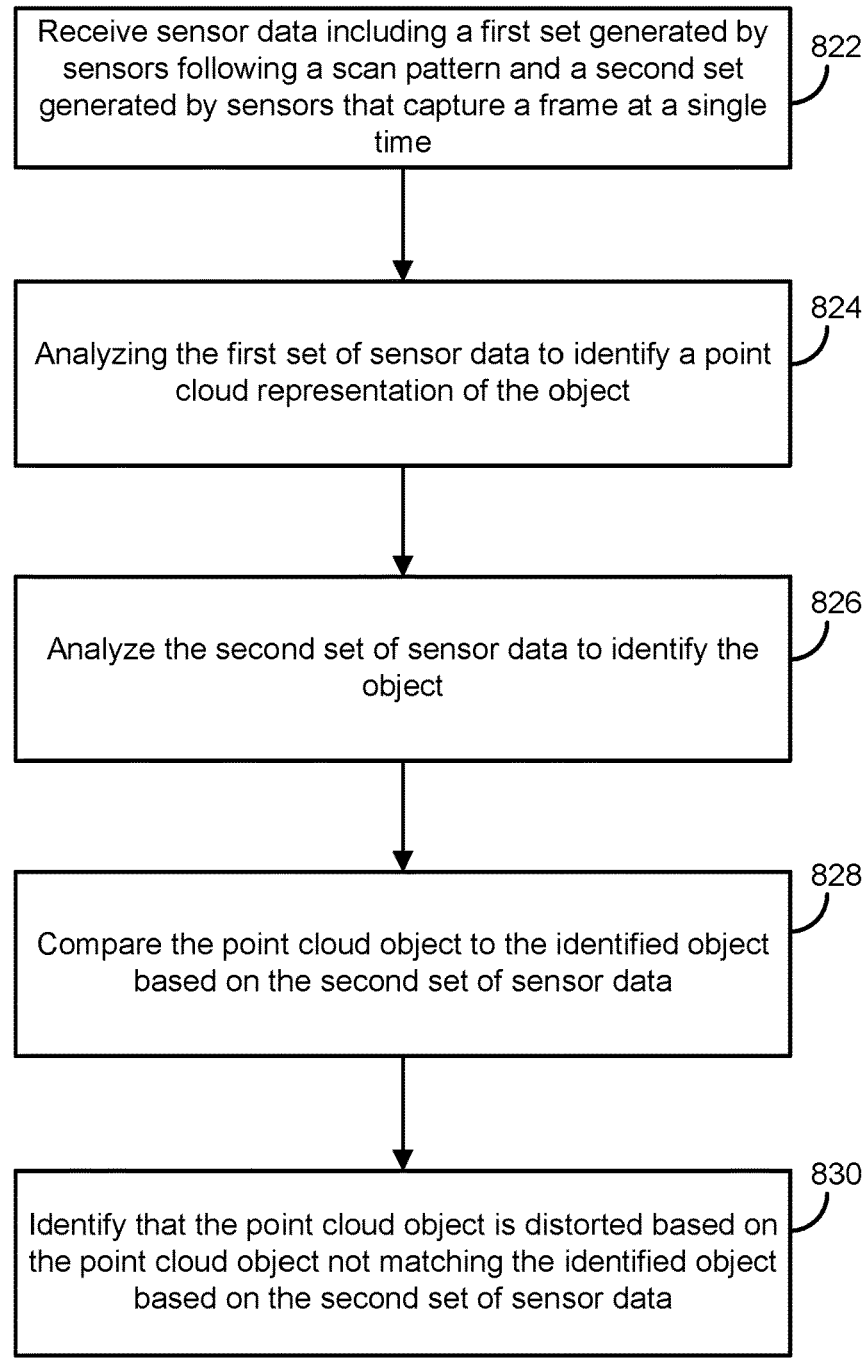
FIG. 12 is a flow diagram of an example method for method for detecting that a point cloud object is distorted by comparing to other sensor data.

FIGS. 11 and 12 depict example methods 800 and 820, respectively, for detecting that a point cloud object, for example, one of the objects 396 of the point cloud 390 depicted in FIG. 4, is distorted and not actually shaped in a manner that appears distorted. The method 800 of FIG. 11 relates to embodiments that detect distortion by analyzing known shapes, and the method 820 of FIG. 12 detects distortion by analyzing sensor data other than just lidar or depth data. The methods 800 and 820 may be implemented/performed by the computing system 500 of FIG. 6 (e.g., by the processor(s) 502 when executing the vehicle controller instructions 506 stored in memory 504), for example, by another suitable computing device or system (such as a controller of the laser 310 or the sensor heads 312 of FIG. 3A, or the software architecture 400 of FIG. 5), or by a combination thereof.

Referring first to the method 800 of FIG. 11, sensor data is received at block 802. The sensor data may include lidar depth data (e.g., sensed by the lidar system 100 of FIGS. 1 and 2, or the lidar system 302 of FIG. 3A), lidar point cloud data (e.g., stitched or compiled lidar depth data), camera data, and any other type of sensor data discussed above in connection with the sensor data 402 of FIG. 5, for example.

At block 804, a point cloud frame based on the sensor data received at block 802 is obtained. In some embodiments, the sensor data received at block 802 includes the point cloud frame (e.g., a laser controller or sensor head controller stitched depth data together to form the point cloud). In these embodiments, block 804 may include extracting the point cloud frame from rest of the sensor data received at block 802. In other embodiments, block 804 includes analyzing depth or lidar data included in the sensor data received at block 802 to generate the point cloud frame, as discussed in connection to FIG. 3, for example.

At block 806, a point cloud object within the point cloud frame obtained at block 804 is identified. In some embodiments, block 806 includes partitioning the point cloud frame into portions in accordance with probable boundaries between separate physical objects, determining object types/classes for at least some of those portions, and tracking movement of classified objects over time, for example, by utilizing a perception component 406 of the vehicle controller 400 of FIG. 5. In one example, a tracking module 414 of the perception component 406 tracks objects across multiple point cloud frames. In this example, the tracking module 414 identifies objects within the point cloud frame obtained at block 704 that are currently being tracked. In another example, the segmentation module 410 may identifies a new object that is not being tracked by the tracking module 416.

At block 808, the point cloud object identified at block 806 is analyzed to identify a feature that has an expected shape. For example, the classification module 412 of the perception component 406 classifies the identified point cloud object as a particular object type. The object type may be associated with a model that includes indications of particular expected features for point cloud objects classified as the particular object type. As one example, a car object type has wheels that are expected to be round, a license plate that is expected to be rectangular, and perhaps a manufacturer logo that has a known shape. As another example, a streetlight object may be expected to have round light bulbs. As yet another example, a stop sign object is expected to be octagonal. Accordingly, block 808 includes analyzing the point cloud object identified at block 806 to detect the region in the point cloud object associated with the feature that has the expected shape.

At block 810, the expected shape of the feature is compared to the shape of the feature of the point cloud object as represented in the point cloud frame obtained at block 804. The expected shape of the feature may be scaled and/or rotated based on depth data associated with the point cloud object. Said another way, the expected shape of the feature is adjusted to account for how the feature is oriented in the point cloud frame. Accordingly, block 810 may include comparing the adjusted expected feature shape to the region on the point cloud object associated with the feature. Alternatively, the feature of the point cloud object may be scaled and/or rotated to match, as closely as possible, a fixed size and orientation corresponding to the expected feature shape.

At block 812, the point cloud object identified at block 806 is determined to be distorted based on the expected feature shape not matching the feature of the point cloud object corresponding to the feature. For example, the feature of the point cloud object may be skewed with respect to the expected feature shape due to rolling shutter distortion. Accordingly, in some implementations, in addition to determining that point cloud object is distorted, block 812 includes determining a skew factor indicative of an amount of skew introduced by each scan line and/or component pixel thereof. The skew factor can be a three-dimensional vector representative of the direction via which the skew is introduced. To determine the skew factor, block 812 may include determining an amount by which the point cloud feature is skewed with respect to the expected feature shape at two different pixels that overlap the point cloud feature. The difference in skews with respect to the expected configuration is then divided by a number of pixels and/or scan lines between when the pixels were captured to determine a skew factor indicative of an amount and direction of skew introduced by each pixel and/or scan line. Accordingly, in some implementations, block 812 includes correcting for the detected skew by utilizing the skew factor to compensate for the amount of skew introduced by each successive scan line and/or pixel.

In some embodiments, the method 800 includes one or more additional blocks not shown in FIG. 11. For example, in some embodiments, the distortion of the point cloud object and/or the skew factor determined at block 812 is analyzed to determine the relative velocity of the point cloud object, for example, using the method 700 of FIG. 8. As yet another example, the point cloud object, for example by the prediction component 420 of FIG. 5, to predict a future state of the vehicle environment. This additional block may further include generating one or more control signals (e.g., operational parameters) that control operation of the vehicle and/or the particular components thereof based on the predicted future state.

Referring now to the method 820 of FIG. 12, sensor data is received at block 822. The sensor data includes a first set of sensor data captured by a first set of one or more sensors configured to sense the vehicle by sequentially advancing through a plurality of points in a scan pattern during a frame, such as lidar depth data sensed by the lidar system 100 of FIGS. 1 and 2, or the lidar system 302 of FIG. 3A. The sensor data also includes a second set of sensor data captured by a second set of one or more sensors that are configured to sense the vehicle environment by capturing the entirety of a frame at a single time, such as camera data captured by a RGB or stereo camera or a thermal imaging sensor.

At block 824, the first set of sensor data is analyzed to obtain a point cloud representation of an object within the vehicle environment. For example, the object may be a vehicle, a road, a street sign, a person, a tree, etc. Accordingly, each of the first and second sets of sensor may include a different digital representation of the same object. In some embodiments, the first set of sensor data received at block 822 includes the point cloud frame (e.g., a laser controller or sensor head controller stitched depth data together to form the point cloud). In these embodiments, block 824 includes extracting the point cloud frame from rest of the first set of sensor data received at block 822. In other embodiments, block 824 includes analyzing the first set of sensor data received at block 802 to generate the point cloud frame, as discussed in connection to FIG. 3, for example. In any event, a perception component, such as the perception component 406 of FIG. 5, analyzes the point cloud frame to identify the object. For example, a tracking module 414 of the perception component 414 may compare tracked objects to the obtained point cloud frame. Accordingly, the tracking component 414 may identify the point cloud representation of the object in the point cloud frame.

At block 826, the second set of sensor data is analyzed to obtain a second digital representation of the object. For example, if the second set of sensor is captured by a RGB camera, the second representation of the object may be a subset of the RGB data that corresponds to the object. For instance, the perception component 406 may associate the first and second sets of sensor data with one another. That is, the perception component 406 may analyze the viewing angles at which the first and second sets of sensors sensed the first and second sets of sensor data to identify regions in each set of sensor data representative of the same portion of the vehicle environment, for example, the object analyzed at block 824. In some implementations, the tracking module 414 associates the point cloud object analyzed at block 826 with RGB data indicative of the object. Thus, the tracking module 414 may utilizes the associated RGB data to identify the object within the second set of sensor data. In other implementations, the perception component 406 includes separate segmentation, classification, and/or tracking modules optimized to analyze RGB data. In these implementations, the point cloud representation of the object and the RGB data representation of the object are tracked separately.

At block 828, the point cloud object and the representation of the object in the second set of sensor data are compared to each other. More particularly, the depth data associated with the first set of sensor data may be "flattened" to obtain a two-dimensional representation of the point cloud object. The shape of the flattened point cloud object may be compared to the shape of the object as represented in the second set of sensor data. In some implementations, the shape of the object as represented in the second set of sensor data is adjusted to account for the different viewing angles associated with the first and second set of sensors.

At block 830, the point cloud representation of the object is identified as distorted based on the comparison at block 828. As described above, because a frame based on the second set of sensor data is captured at a single time, there is no rolling shutter distortion that impacts the shape of the object as represented in the second set of sensor data. Said another way, the second set of sensor data indicates the "true" shape of the object. Thus, when the comparison at block 828 indicates that the shape of the point cloud representation of the object and the shape of the object as represented by the second set of sensor data do not match, it is determined that the point cloud object (i.e., the representation of the object, as opposed to the object itself) is distorted.

In some embodiments, the method 820 includes one or more additional blocks not shown in FIG. 12. For example, one additional block may include determining a skew factor indicative of an amount of skew introduced by each scan line and/or component pixel thereof. The skew factor can be a three-dimensional vector representative of the direction via which the skew is introduced. To determine the skew factor, this additional block may include determining an amount of the point cloud feature is skewed with respect to an expected configuration as indicated by the second set of sensor data at two different pixels that overlap the point cloud feature based on the comparison at block 830. The difference in skew with respect to the second set of sensor data is then divided by a number of pixels and/or scan lines between when the pixels were captured to determine the skew factor. Accordingly, in some implementations, this additional block includes correcting for the detected skew by utilizing the skew factor to compensate for the amount of skew introduced by each successive scan line and/or pixel As another example, in some embodiments, the distortion of the point cloud object and/or the skew factor determined at the above additional block is analyzed to determine the relative velocity of the point cloud object, for example, using the method 700 of FIG. 8. As yet another example, the point cloud object, for example by the prediction component 420 of FIG. 5, to predict a future state of the vehicle environment. This additional block may further include generating one or more control signals (e.g., operational parameters) that control operation of the vehicle and/or the particular components thereof based on the predicted future state.

Although this disclosure describes example embodiments where a lidar system is incorporated into a vehicle, the embodiments described herein may also be applied to stationary lidar systems. For example, a lidar system may be affixed to a stationary object (e.g., a light pole, a utility pole, a street sign, a traffic light, or a building). Any rolling shutter distortion of an object may be attributed to movement of that object since the stationary lidar system would not contribute to the rolling shutter distortion. As a result, a stationary lidar system may be configured to determine the absolute velocity of objects rather than a relative velocity.

General Considerations

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A computer-implemented method of determining a relative velocity between a vehicle and an object, the method comprising:
   receiving sensor data generated by one or more sensors of the vehicle, wherein the one or more sensors are configured to sense an environment of the vehicle by following a scan pattern comprising component scan lines;
   obtaining, based on the sensor data and by one or more processors, a point cloud frame representative of the environment, the point cloud frame comprising a plurality of points, each point comprising depth data associated with the point and a time at which the depth data was captured;
   selecting, by the one or more processors, two or more points of the scan pattern that overlap the object, wherein:
      the selected points are located on or near a two-dimensional surface corresponding to at least part of the object, and the depth data for two or more of the selected points are captured at different times; and
      selecting the two or more points comprises:
         identifying a region of the point cloud frame that corresponds to a location of the object in the point cloud frame; and
         selecting the two or more points from within the identified region of the point cloud frame; and
   calculating, by the one or more processors, the relative velocity between the vehicle and the object based at least in part on the depth data and capture times associated with the selected points.

2. The computer-implemented method of claim 1, wherein calculating the relative velocity comprises:
   approximating the two-dimensional surface of the object in a vicinity of the selected points with a two-dimensional plane; and
   fitting the selected points to an equation of the two-dimensional plane moving in space with the relative velocity.

3. The computer-implemented method of claim 2, wherein the two-dimensional plane is positioned in a particular fixed orientation when fitting the selected points to the equation of the two-dimensional plane.

4. The computer-implemented method of claim 2, wherein:
   the selected points comprise three or more points; and
   calculating the relative velocity further comprises rotating the two-dimensional plane around a particular rotation axis of the two-dimensional plane when fitting the selected points to the equation.

5. The computer-implemented method of claim 2, wherein:
   the selected points comprise four or more points; and
   calculating the relative velocity further comprises rotating the two-dimensional plane around two particular axes of rotation of the two-dimensional plane when fitting the selected points to the equation.

6. The computer-implemented method of claim 1, wherein the relative velocity comprises a relative velocity along a particular axis of relative motion.

7. The computer-implemented method of claim 1, wherein the selected points comprise three or more points, and the relative velocity comprises two components of relative velocity along two particular independent axes of relative motion.

8. The computer-implemented method of claim 1, wherein the selected points comprise four or more points, and the relative velocity comprises three components of relative velocity along three particular independent axes of relative motion.

9. The computer-implemented method of claim 1, wherein calculating the relative velocity comprises adjusting fitting parameters of an equation corresponding to the two-dimensional surface moving in space with the relative velocity until the selected points are substantially fit to the equation.

10. The computer-implemented method of claim 1, wherein:
the selected points comprise a first point and a second point; and
the first and second points are part of a first scan line that traverses the environment in a first direction, and the first and second points are displaced from each other along the first direction.

11. The computer-implemented method of claim 1, wherein:
the selected points comprise:
a first point and a second point which are part of a first scan line that traverses the environment in a first direction; and
a third point and a fourth point which are part of a second scan line that traverses the environment in a second direction opposite the first direction; and
the method further comprises:
calculating, by the one or more processors, a first relative velocity based on a difference between the depth data associated with the first and second points and a difference in time between when the depth data for the first and second points were captured; and
calculating, by the one or more processors, a second relative velocity based on a difference between the depth data associated with the third and fourth points and a difference in time between when the depth data for the third and fourth points were captured.

12. The computer-implemented method of claim 11, further comprising:
comparing, by the one or more processors, a polarity of the first relative velocity and a polarity of the second relative velocity; and
identifying, by the one or more processors, that the two-dimensional surface is distorted based at least in part on the polarity of the first relative velocity not matching the polarity of the second relative velocity.

13. The computer-implemented method of claim 11, further comprising:
comparing, by the one or more processors, a magnitude of the first relative velocity and a magnitude of the second relative velocity to determine that the magnitudes of the first and second relative velocities are approximately equal; and
associating, by the one or more processors, the first or second relative velocity with the relative velocity between the vehicle and the object.

14. The computer-implemented method of claim 11, further comprising:
comparing, by the one or more processors, a magnitude of the first relative velocity and a magnitude of the second relative velocity to determine that the magnitudes of the first and second relative velocities are approximately equal; and
determining, by the one or more processors, a relative acceleration between the vehicle and the object.

15. The computer-implemented method of claim 1, further comprising:
determining that the calculated relative velocity exceeds a threshold velocity; and
in response to determining that the calculated relative velocity exceeds the threshold velocity, disregarding the calculated relative velocity.

16. A system within an autonomous vehicle, the system comprising:
a set of sensors configured to generate a set of sensor data by sensing an environment of the vehicle by following a scan pattern comprising component scan lines; and
a computing system configured to:
receive the set of sensor data;
obtain, based on the sensor data, a point cloud frame representative of the environment, the point cloud frame comprising a plurality of points, each point comprising depth data associated with the point and a time at which the depth data was captured by the set of sensors;
select two or more points of the scan pattern that overlap an object in the environment, wherein:
the selected points are located on or near a two-dimensional surface corresponding to at least part of the object, and the depth data for two or more of the selected points are captured at different times; and
selecting the two or more points comprises:
identifying a region of the point cloud frame that corresponds to a location of the object in the point cloud frame; and
selecting the two or more points from within the identified region of the point cloud frame; and
calculate a relative velocity between the autonomous vehicle and the object based at least in part on the depth data and capture times associated with the selected points.

17. The system of claim 16, wherein:
the selected points comprise a first point and a second point; and
the relative velocity v between the vehicle and the object is calculated from an expression $v=\Delta d/\Delta t$, wherein $\Delta d$ is a difference between the depth data associated with the first and second points and $\Delta t$ is a difference in time between when the depth data was captured for the first and second points.

18. The system of claim 16, wherein to calculate the relative velocity, the computing system is configured to:
approximate the two-dimensional surface of the object in a vicinity of the selected points with a two-dimensional plane; and
fit the selected points to an equation of the two-dimensional plane moving in space with the relative velocity.

19. The system of claim 18, wherein:
the selected points comprise three or more points; and
to calculate the relative velocity, the computing system is configured to rotate the two-dimensional plane around a particular rotation axis of the two-dimensional plane when fitting the selected points to the equation.

20. The system of claim 18, wherein:
the selected points comprise four or more points; and
to calculate the relative velocity, the computing system is configured to rotate the two-dimensional plane around two particular axes of rotation of the two-dimensional plane when fitting the selected points to the equation.

21. A computer-implemented method of determining a relative velocity between a vehicle and an object, the method comprising:
receiving sensor data generated by one or more sensors of the vehicle, wherein the one or more sensors are configured to sense an environment of the vehicle by following a scan pattern comprising component scan lines;
obtaining, based on the sensor data and by one or more processors, a point cloud frame representative of the environment, the point cloud frame comprising a plurality of points, each point comprising depth data associated with the point and a time at which the depth data was captured;
selecting, by the one or more processors, two or more points of the scan pattern that overlap the object, the selected two or more points comprising a first point and a second point, wherein:
the selected points are located on or near a two-dimensional surface corresponding to at least part of the object, and the depth data for two or more of the selected points are captured at different times; and
the first point is part of a first scan line that traverses the environment in a first direction, the second point is part of a second scan line that is substantially parallel to the first scan line, and the first and second points are displaced from each other along a direction substantially orthogonal to the first direction; and
calculating, by the one or more processors, the relative velocity between the vehicle and the object based at least in part on the depth data and capture times associated with the selected points, wherein the relative velocity v between the vehicle and the object is calculated from an expression $v=\Delta d/\Delta t$, wherein $\Delta d$ is a difference between the depth data associated with the first and second points and $\Delta t$ is a difference in time between when the depth data was captured for the first and second points.

22. A computer-implemented method of determining a relative velocity between a vehicle and an object, the method comprising:
receiving sensor data generated by one or more sensors of the vehicle, wherein the one or more sensors are configured to sense an environment of the vehicle by following a scan pattern comprising component scan lines;
obtaining, based on the sensor data and by one or more processors, a point cloud frame representative of the environment, the point cloud frame comprising a plurality of points, each point comprising depth data associated with the point and a time at which the depth data was captured;
selecting, by the one or more processors, two or more points of the scan pattern that overlap the object in a first region of the object, wherein the selected points are located on or near a two-dimensional surface corresponding to at least part of the object, and the depth data for two or more of the selected points are captured at different times;
calculating, by the one or more processors, a first relative velocity between the vehicle and the object based at least in part on the depth data and capture times associated with the selected points;
selecting, by the one or more processors, another two or more points of the scan pattern that overlap the object in a second region of the object different from the first region;
calculating, by the one or more processors, a second relative velocity between the vehicle and the object based at least in part on the depth data and capture times associated with the selected another points; and
comparing, by the one or more processors, the first relative velocity and the second relative velocity to determine that the object is rotating with respect to the vehicle.

23. The computer-implemented method of claim 22, wherein the selected points comprise four or more points and the four or more points are selected from two different scan lines, wherein at least two points are selected from each scan line.

24. The computer-implemented method of claim 23, wherein the two different scan lines are scanned in substantially opposite directions.

* * * * *